US007012932B1

(12) United States Patent
Mizobata

(10) Patent No.: US 7,012,932 B1
(45) Date of Patent: Mar. 14, 2006

(54) DIGITAL BROADCAST DATA RECEIVING APPARATUS

(75) Inventor: Norihiko Mizobata, Habikino (JP)

(73) Assignee: Matsushita Electric Industrial Co., LTD, Osaka (JP)

(*) Notice: Subject to any disclaimer, the term of this patent is extended or adjusted under 35 U.S.C. 154(b) by 0 days.

(21) Appl. No.: 09/339,246

(22) Filed: Jun. 24, 1999

(30) Foreign Application Priority Data

Jun. 24, 1998 (JP) .......................................... 10-177591

(51) Int. Cl.
*H04J 1/00* (2006.01)
*H04K 1/00* (2006.01)
*H04N 7/20* (2006.01)

(52) U.S. Cl. ....................... 370/487; 370/490; 370/535; 370/430; 380/240; 380/42; 380/277; 380/278; 380/210; 380/270; 725/31; 725/68; 725/70; 725/63

(58) Field of Classification Search ................. 380/239, 380/240, 42, 277, 228, 210, 270; 725/31, 725/68, 70, 63, 59, 25, 131, 139, 151, 66; 370/486–490, 535–541, 347, 280, 294, 390, 370/389, 352, 337, 321, 465, 430, 442; 348/726, 348/720, 721
See application file for complete search history.

(56) References Cited

U.S. PATENT DOCUMENTS 5,642,418 A * 6/1997 Farris et al. ................ 380/211
5,838,383 A 11/1998 Chimoto et al. ............ 348/553
5,864,358 A * 1/1999 Suzuki et al. ............... 348/731
5,917,915 A * 6/1999 Hirose ........................ 380/228
5,923,755 A * 7/1999 Birch ......................... 380/212
6,166,778 A * 12/2000 Yamamoto et al. ......... 348/569
6,175,683 B1 * 1/2001 Sugimura et al. ........ 348/423.1
6,266,813 B1 * 7/2001 Ihara .......................... 725/146

(Continued)

FOREIGN PATENT DOCUMENTS

EP 980161 A1 * 2/2000

(Continued)

*Primary Examiner*—Chi Pham
*Assistant Examiner*—Ronald Abelson
(74) *Attorney, Agent, or Firm*—Wenderoth, Lind & Ponack, L.L.P.

(57) ABSTRACT

A digital broadcast data receiving apparatus comprises a plurality of broadcast data receiving units for receiving digital broadcast data supplied from a plurality of digital broadcast data sources, respectively and a parallel receiving unit for receiving, from the digital broadcast data output from the plural broadcast data receiving units, object program broadcast data which are multiplexed digital broadcast data including program broadcast data relating to an object program broadcast to be viewed by the viewer, and received broadcast data which are digital broadcast data output from the broadcast data receiving unit different from the broadcast data receiving unit which outputs the object program broadcast data. The parallel receiving unit performs the following processes according to time division multiplexing: a process of extracting program broadcast data relating to the object program broadcast to be viewed from the object program broadcast data, and a process of extracting data including information to be obtained even when the viewer does not watch the broadcast, from the received broadcast data. Therefore, it is possible to realize a receiving apparatus Which receives digital broadcast data supplied from plural input sources at the same time, and obtains necessary data included in the digital broadcast data supplied from one of the input sources while displaying the digital broadcast data supplied from the other input source, on a television receiver.

12 Claims, 13 Drawing Sheets

U.S. PATENT DOCUMENTS

| | | | | | |
|---|---|---|---|---|---|
| 6,314,568 | B1 | * | 11/2001 | Ochiai et al. | 725/34 |
| 6,373,534 | B1 | * | 4/2002 | Yasuki et al. | 348/725 |
| 6,380,984 | B1 | * | 4/2002 | Inoue et al. | 348/563 |
| 6,424,380 | B1 | * | 7/2002 | Osaka | 348/24 |
| 6,477,317 | B1 | * | 11/2002 | Itokawa | 386/95 |

FOREIGN PATENT DOCUMENTS

| | | |
|---|---|---|
| JP | 08-079641 | 3/1996 |
| JP | 9-70027 | 3/1997 |
| JP | 09-102923 | 4/1997 |
| JP | 9-238292 | 9/1997 |

* cited by examiner

DIGITAL BROADCAST DATA RECEIVING APPARATUS

FIELD OF THE INVENTION

The present invention relates to a digital broadcast data receiving apparatus which receives plural pieces of digital broadcast data at the same time from plural pieces of digital broadcast data sources, and displays the contents recorded in the input digital broadcast data on an external display unit such as a television receiver.

BACKGROUND OF THE INVENTION

To date, digital television broadcasting in which plural pieces of information can be transmitted at the same time (hereinafter referred to simply as "digital broadcasting") has attracted attention as a form of digital broadcasting, and this has already been put to practical use as digital broadcasting using satellites. Further, it is anticipated that, in the future, there will coexist various digital broadcasts using different transmission forms by different broadcast providers, such as digitized ground wave television broadcasts and digital satellite broadcasts by different broadcast providers. However, a digital broadcast data receiving apparatus for receiving digital broadcasts (hereinafter, referred to simply as "receiving apparatus") has a large circuit scale and so the size of the receiving apparatus itself is large. Further, the receiving apparatus is expensive because it is composed of many parts. So, in the case where many digital broadcasts coexist, it is desired that a single receiving apparatus can receive plural digital broadcasts.

Generally, digital broadcasting employs a packet mode data transmission method based on the MPEG (Moving Picture Experts Group) system standard, which is an international standard. In this method, to avoid illegal viewers, program broadcast data relating to program broadcasts, such as video and audio data, are encoded.

Further, in contrast with the conventional analog broadcasting, other data required for receiving program broadcasts (hereinafter referred to simply as "required data") are multiplexed with the program broadcast data to be transmitted. For example, program tables, mails to the viewer, and entitlement management messages (hereinafter referred to as "EMM") such as key information for decoding are multiplexed with the program broadcast data.

Since it is not known in advance when the data like the key information for decoding or the mail to the viewer, which is to be received even when the viewer does not watch the program, is actually transmitted, the receiving apparatus must receive the program broadcast continuously, whether the viewer watches the received program broadcast or not.

Further, since it is not known when the updating of the program table data is performed, the receiving apparatus must continuously receive the program table data which is included in the required data that is multiplexed in the digital broadcast data. When it is received, the program table data stored in the receiving apparatus should be immediately updated.

Moreover, when a lot of digital broadcasts coexist, it is desired that, while the viewer watches a program, the receiving apparatus receives and records another program which is broadcast on a different channel in the same period of time.

To be specific, as long as a digital VTR is able to receive a digital broadcast, record the received digital broadcast data in a recording medium, and playback the recording medium in which the digital broadcast data is recorded, this digital VTR can obtain the information to be received (e.g., a mail to the viewer which is broadcast in a satellite broadcast or the like, key information for decoding, which is required when the viewer resumes watching the digital broadcast transmitted after playback of the digital VTR has ended, etc.) while reproducing the digital broadcast data recorded in the recording medium.

However, existing receiving apparatus are designed so as to receive only one broadcast and, therefore, they cannot receive another broadcast simultaneously with the broadcast being received.

So, in designing a receiving apparatus which can receive a plurality of digital broadcasts at the same time, it is desired that the receiving apparatus can obtain various kinds of information multiplexed in a digital broadcast (a first broadcast) which are desired by the viewer or required to be obtained even when the viewer does not watch the broadcast, while the viewer watches another digital broadcast (a second broadcast). Thereby, when the viewer resumes watching the first broadcast which has been interrupted because the viewer has watched the second broadcast, it is avoided that information required for the first broadcast is insufficient or that information transmitted as a mail is missed.

Further, in the case of the above-mentioned digital VTR, it is considered to construct a receiving apparatus which receives a plurality of digital broadcasts from different channels or different providers, or a plurality Of digital broadcast data from different input sources such as digital VTRs, by integrating circuits of receivers each receiving a digital broadcast from a channel or a provider, or circuits for processing program data taken from data reproduced by the digital VTRs.

In the case of analog broadcasting, since an analog broadcast receiving apparatus can be designed in a relatively simple circuit construction, the size of the apparatus itself is not so large, and it is easy to integrate plural receivers in one analog broadcast receiving apparatus. So, the cost of the apparatus can be reduced. However, in the case of a digital broadcast data receiving apparatus, if plural receivers are simply integrated, the cost of the receiving apparatus increases with the number of the receivers since the construction of each receiving circuit is complicated. In this case, the circuit scale and the cost of the receiving apparatus are equivalent to those in the case of buying a plurality Of receivers for the respective broadcasts (channels or providers). Furthermore, since the circuit scale increases, the size of the receiving apparatus itself increases with the number of digital broadcasts to be received.

SUMMARY OF THE INVENTION

The present invention is made to solve the above-described problems and its object is to provide a digital broadcast data receiving apparatus with a reduced circuit scale, which receives a plurality of digital broadcast data from different input sources at the same time, and displays the data of a television program or the like included in the digital broadcast data received through one of the input sources on an external television receiver, and, simultaneously, extracts information to be obtained for the viewer from data included in the digital broadcast data received through the other input source.

Other objects and advantages of the invention will become apparent from the detailed description that follows.

The detailed description and specific embodiments described are provided only for illustration since various additions and modifications within the scope of the invention will be apparent to those skilled in the art of the detailed description.

According to a first aspect of the present invention, there is provided a digital broadcast data receiving apparatus for receiving digital broadcast data in which program broadcast data relating to a program broadcast and data required for receiving the program broadcast are multiplexed as digital data, and for processing the digital broadcast data. This apparatus comprises: a plurality of broadcast data receiving means for receiving digital broadcast data supplied from a plurality of digital broadcast data sources, respectively; and parallel receiving means for receiving, from the digital broadcast data output of the plural broadcast data receiving means, object program broadcast data which are multiplexed digital broadcast data including program broadcast data relating to an object program broadcast to be viewed by the viewer, and received broadcast data which are digital broadcast data output from the broadcast data receiving means different from the broadcast data receiving means which outputs the object program broadcast data; and the parallel receiving means performing the following processes according to time division multiplexing: a process of extracting program broadcast data relating to the object program broadcast to be viewed by the viewer from the object program broadcast data, and a process of extracting data including information to be obtained even when the viewer does not watch the broadcast, from the received broadcast data. This apparatus displays the object program to be viewed by the viewer, which is supplied from one of the digital broadcast data sources, and, simultaneously, obtains information to be received even when the viewer does not watch the digital broadcast including the information, which is supplied from the other digital broadcast data source. Therefore, it is possible to avoid a lack of information that is required when the viewer resumes watching the digital broadcast which has not been viewed, and the omission of a mail to the viewer transmitted in the digital broadcast which is not viewed.

According to a second aspect of the present invention, in the digital broadcast data receiving apparatus of the first aspect, at least one of the digital broadcast data sources is a digital data reproduction apparatus which is able to reproduce the digital broadcast data, and the program broadcast data relating to a program broadcast to be viewed by the viewer is selected from the digital broadcast data reproduced by the digital data reproduction apparatus. This apparatus displays the object program to be viewed which is included in the digital broadcast data recorded in a recording medium and, simultaneously, obtains information to be received which is transmitted in a digital broadcast which is not viewed by the viewer. Therefore, it is possible to avoid a lack of information that is required when the viewer resumes watching the digital broadcast which has not been viewed, and avoids an omission of a mail to the viewer transmitted in the digital broadcast while the viewer watches the program reproduced by the digital VTR.

According to a third aspect of the present invention, in the digital broadcast data receiving apparatus of the first or second aspect, the parallel receiving means comprises: a plurality of input storage means each receiving, from one of the respective digital broadcast data sources, the digital broadcast data in which the program broadcast data in packet format and the required data in packet format are multiplexed in order to temporarily store the digital broadcast data; input selection means for sequentially taking the stored packets from the plural input storage means by repeating the process of selecting any of the input storage means in which at least one packet is stored and then taking the packet from the input storage means; and packet selection means for selecting, from a sequence of packets sequentially taken by the input selection means, only packets containing the object program broadcast data and packets containing the data including the information to be obtained even when the viewer does not watch the broadcast. Therefore, required packets can be simultaneously taken from the respective data received in parallel with the object program broadcast data.

According to a fourth aspect of the present invention, in the digital broadcast data receiving apparatus of the third aspect, the input selection means enables a process of successively taking the packets at a rate higher than a rate obtained by multiplying the maximum value of the data writing rate into the input storage means by the number of the input storage means. Therefore, there is no fear of omitting packets to be taken from the digital broadcast data supplied from the plural input sources.

According to a fifth aspect of the present invention, in the digital broadcast data receiving apparatus of the third aspect, when at least one packet containing the object program broadcast data is stored in any of the input Storage means, the input selection means selects this input storage means with priority to take the packet from this input storage means. Therefore, it is possible to read the packets of information relating to the object program to be viewed without omission in order to display the program.

According to a sixth aspect of the present invention, in the digital broadcast data receiving apparatus of the first aspect, the parallel receiving means comprises: a plurality of input storage means for receiving the digital broadcast data in packet format from the respective digital broadcast data sources to temporarily store the digital broadcast data; and unnecessary packet discarding means for taking only packets containing the object program broadcast data from the packets supplied from the digital broadcast data sources, and when discarding packets containing data other than the object program broadcast data, taking the packets stored in the input storage means and then discarding unnecessary packets other than packets containing the information to be obtained even when the viewer does not watch the broadcast. Therefore, required packets can be taken simultaneously from the program broadcast data and the received broadcast data. Furthermore, the storage means for the program broadcast data, which requires a capacity for about two packets, is dispensed with, and the selection of packets from the program broadcast data and the received broadcast data is done by using a single packet selection circuit, whereby the circuit scale can be reduced.

According to a seventh aspect of the present invention, in the digital broadcast data receiving apparatus of the first aspect, the parallel receiving means comprises: a plurality of input storage means for receiving the digital broadcast data from the respective digital broadcast data sources to temporarily store the digital broadcast data; packet taking/discarding selection means for: taking only packets containing the object program broadcast data from the digital broadcast data supplied from the digital broadcast data sources, discarding packets containing data other than the object program broadcast data, and outputting packet discard information when the packets containing data other than the object program broadcast data are discarded; at least one piece of necessary packet selection means provided correspondingly to the input storage means for: selecting the input storage means which stores at least one packet when receiving the packet discard information, extracting the packets from the selected input storage means, and taking, from the extracted packets, packets including the information to be obtained even when the viewer does not watch the broadcast; and packet taking/output means for selecting, on receipt of the packet discard information, the necessary packet selecting means from which unnecessary packets are discarded by the packet taking/discarding selection means in order to output only necessary packets, and taking the necessary packets to be output. Therefore, required packets can be taken simultaneously from the program broadcast data and the received broadcast data. Furthermore, storage means for the program broadcast data, which requires a capacity for about two packets, is dispensed with, whereby the circuit scale can be reduced.

According to an eighth aspect of the present invention, in the digital broadcast data receiving apparatus of the first aspect, the parallel receiving means comprises: packet taking/discarding selection means for: selecting only packets containing the object program broadcast data from the digital broadcast data received by the digital broadcast data receiving apparatus to output these packets, discarding packets containing data other than the object program broadcast data, and outputting packet discard information when the packets containing data other than the object program broadcast data are discarded; at least one piece of desired packet selection means for selecting only packets which contain the digital broadcast data including the information to be obtained even when the viewer does not watch the broadcast, from the digital broadcast data supplied from the digital broadcast data sources; at least one piece of desired packet input storage means provided correspondingly to the desired packet selection means for temporarily storing the packets including the information to be obtained even when the viewer does not watch the broadcast in which packets are output from the desired packet selection means; and desired packet taking/output means for: selecting, on receipt of the packet discard information, the desired packet input storage means in which unnecessary packets are discarded by the packet taking/discarding selection means and so only necessary packets are stored, and taking the necessary packets from the selected desired packet input Storage means to output these packets. Therefore, required packets can be taken simultaneously from the program broadcast data and the received broadcast data. Further, since only necessary information is selected and then it is temporarily stored in the input storage means, unwanted overflow of the input storage means is avoided even when the number of packets of the program to be viewed increases, whereby the information to be obtained is received with high reliability.

DETAILED DESCRIPTION OF THE PREFERRED EMBODIMENTS

Hereinafter, preferred embodiments of the present invention will be described with reference to the drawings. The embodiments described hereinafter are merely examples, and the present invention is not restricted to these embodiments. Further, in the following description, it is premised that the packet mode data transmission method based on the MPEG system standard (the international standard) is employed for transmitting digital broadcast data. Further, it is premised that digital broadcast data is composed of program broadcast data relating to a program broadcast and other data required for receiving the program broadcast (hereinafter referred to simply as "required data") such as a program table, a mail to the viewer, an EMM (Entitlement Management Message) such as key information, etc., where all of these data are contained in packets.

[Embodiment 1]

A description will be given of a receiving apparatus 300 as a first embodiment of the present invention, with reference to FIGS. 1–3.

Figure 1:
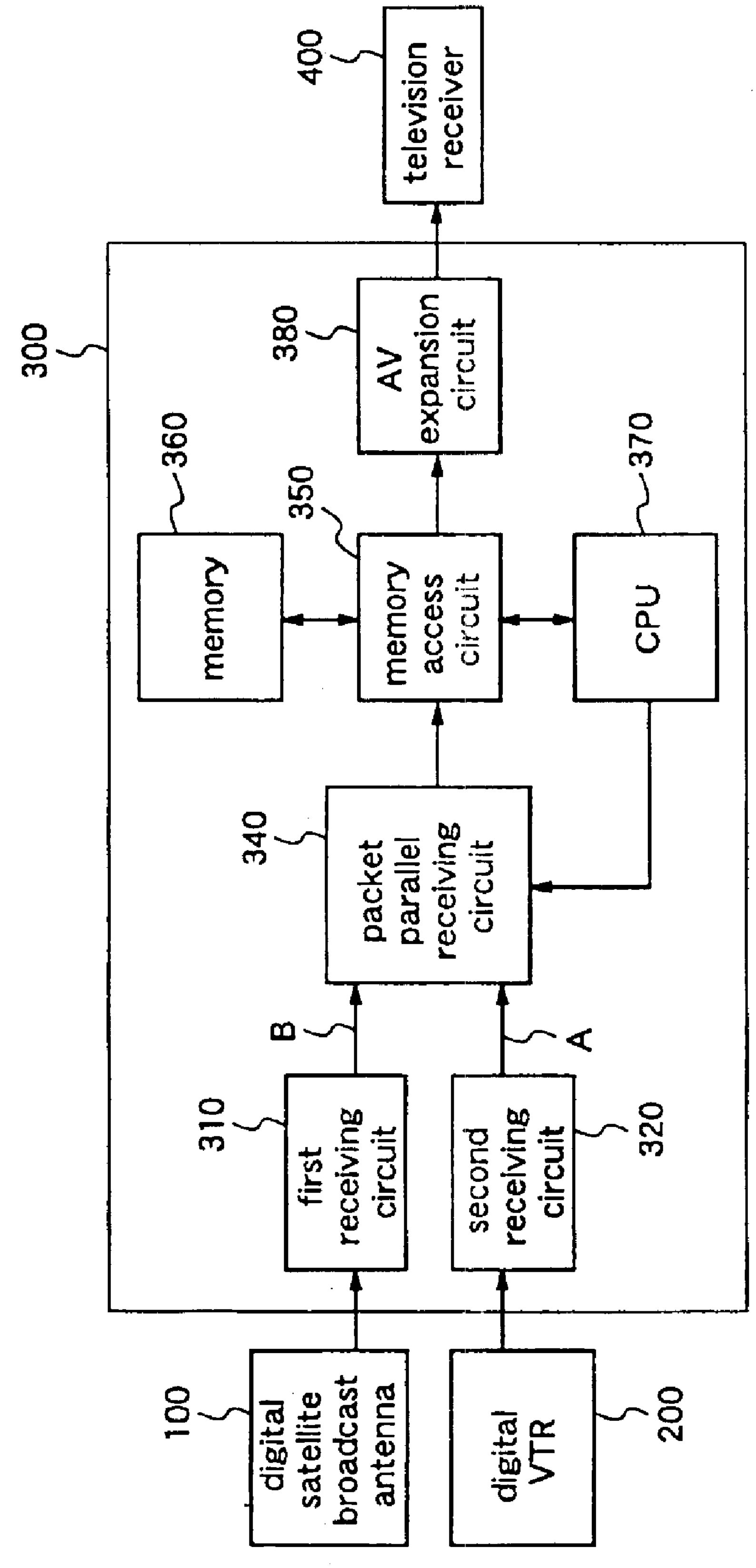
FIG. 1 is a block diagram illustrating the structure of a digital broadcast data receiving apparatus according to a first embodiment of the present invention.

FIG. 1 is a block diagram illustrating the structure of the receiving apparatus 300.

The receiving apparatus 300 comprises a first receiving circuit 310, a second receiving circuit 320, a packet parallel receiving circuit 340, a memory access circuit 350, a memory 360 a CPU 370, and an AV expansion Circuit 380. The first receiving circuit 310 is connected with a digital satellite broadcast antenna 100, and the second receiving circuit 320 is connected with a digital VTR 200. The AV expansion circuit 380 is connected with a television receiver 400.

Each of these components will be briefly described hereinafter.

The digital satellite broadcast antenna 100 receives broadcast data of a satellite broadcast. The digital VTR 200 records digital broadcast data (hereinafter referred to simply as "broadcast data") in a record medium, and reproduces the broadcast data from the record medium.

The receiving apparatus 300 receives the broadcast data received by the digital satellite broadcast antenna 100 and, simultaneously the broadcast data reproduced by the digital VTR 200, and processes these broadcast data in parallel.

The first receiving circuit 310 outputs the broadcast data received through the digital satellite broadcast antenna 100, as received data B, to the packet parallel receiving circuit 340.

The second receiving circuit 320 outputs the broadcast data received from the digital VTR 200, as program data A, to the packet parallel receiving circuit 340.

In the following description, "program data A" indicates object program broadcast data in which program broadcast data relating to an object program broadcast to be viewed by the viewer are multiplexed. On the other hand, "received data B" indicates broadcast data other than the above-mentioned object program broadcast data, such as key information for decoding, data relating to a program to be viewed by the viewer in another period of time, etc.

The packet parallel receiving circuit 340 takes necessary data from the received data B and the program data A, respectively, and outputs these data. This process will be later described in more detail.

The memory access Circuit 350 writes and records the data output from the packet parallel receiving circuit 340 in the memory 360.

The memory 360 stores the data output from the packet parallel receiving circuit 340, according to an instruction of the memory access circuit 350.

The CPU 370 gives instructions for the operation of the packet parallel receiving circuit 340, the memory access Circuit 350, and the memory 360.

The AV expansion circuit 380 reads video data and audio data recorded in the memory 360 by using the memory access circuit 350 and reproduces (i.e., expands) these data as a video signal and an audio signal to be output.

The television receiver 400 displays and outputs the video signal and the audio signal reproduced by the AV expansion circuit 380, respectively.

The packet parallel receiving circuit 340 will be described in more detail with reference to FIG. 2.

Figure 2:
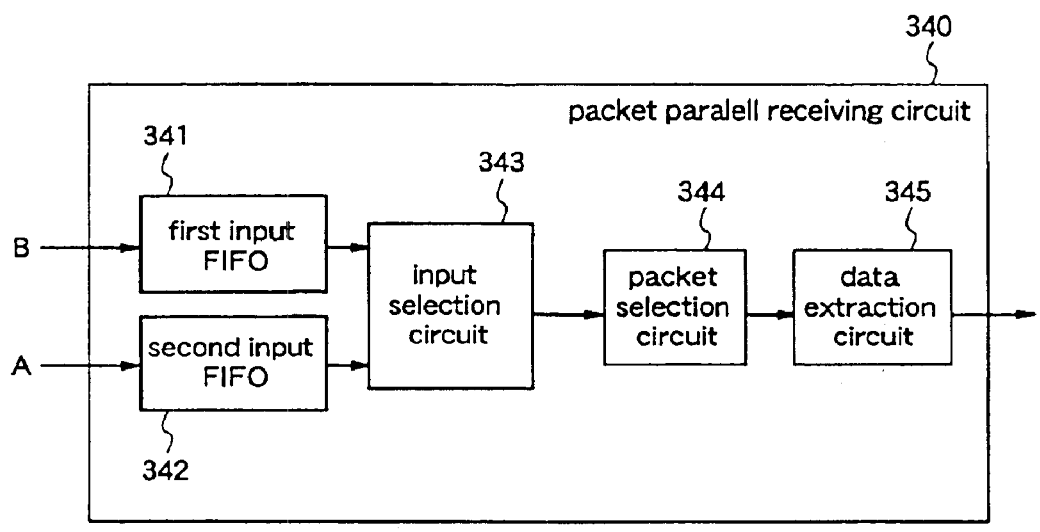
FIG. 2 is a block diagram illustrating the detailed structure of a packet parallel receiving circuit shown in FIG. 1.

FIG. 2 is a block diagram illustrating the internal structure of the packet parallel receiving circuit 340 shown in FIG. 1.

With reference to FIG. 2, the packet parallel receiving circuit 340 comprises a first input FIFO 341, a second input FIFO 342, an input selection circuit 343, a packet selection circuit 344, and a data extraction circuit 345.

These components will be briefly described hereinafter.

The first input FIFO 341 successively stores the received data B supplied from the first receiving circuit 310.

The second input FIFO 342 successively stores the program data A supplied from the second receiving circuit 320.

Each of the first and second FIFOs 341 and 342 outputs a read request to the input selection circuit 343 when at least one packet of data is stored in it.

In response to the read requests from the first FIFO 341 and the second FIFO 342, the input selection circuit 343 reads the received data B and the program data A from the first FIFO 341 and the second FIFO 342, respectively, and outputs these data to the packet selection circuit 344.

The packet selection circuit 344 selects, from the program data A, packets containing program broadcast data relating to a program broadcast to be viewed by the viewer, and selects, from the received data B, packets containing required data to be received and obtained even when the viewer does not watch the digital broadcast.

The data extraction circuit 345 extracts the video and audio information and the required data from the packets selected by the packet selection circuit 344, and performs decoding or the like.

The above-mentioned required data are data which are required even when the viewer does not watch the digital broadcast, for example, an EMM such as key information for decoding, or a mail to the viewer. Accordingly, even when the viewer does not watch the digital broadcast, the receiving apparatus must receive the digital broadcast data to obtain the required information. So, in the receiving apparatus 300 of this first embodiment, even when the viewer watches a digital broadcast program, the packet parallel receiving circuit 340 receives the received broadcast data B, which is broadcast data other than the program broadcast data A relating to the digital broadcast program being viewed, and processes the data.

Next, the operation of the receiving apparatus 300 will be described with reference to FIG. 3.

Figure 3:
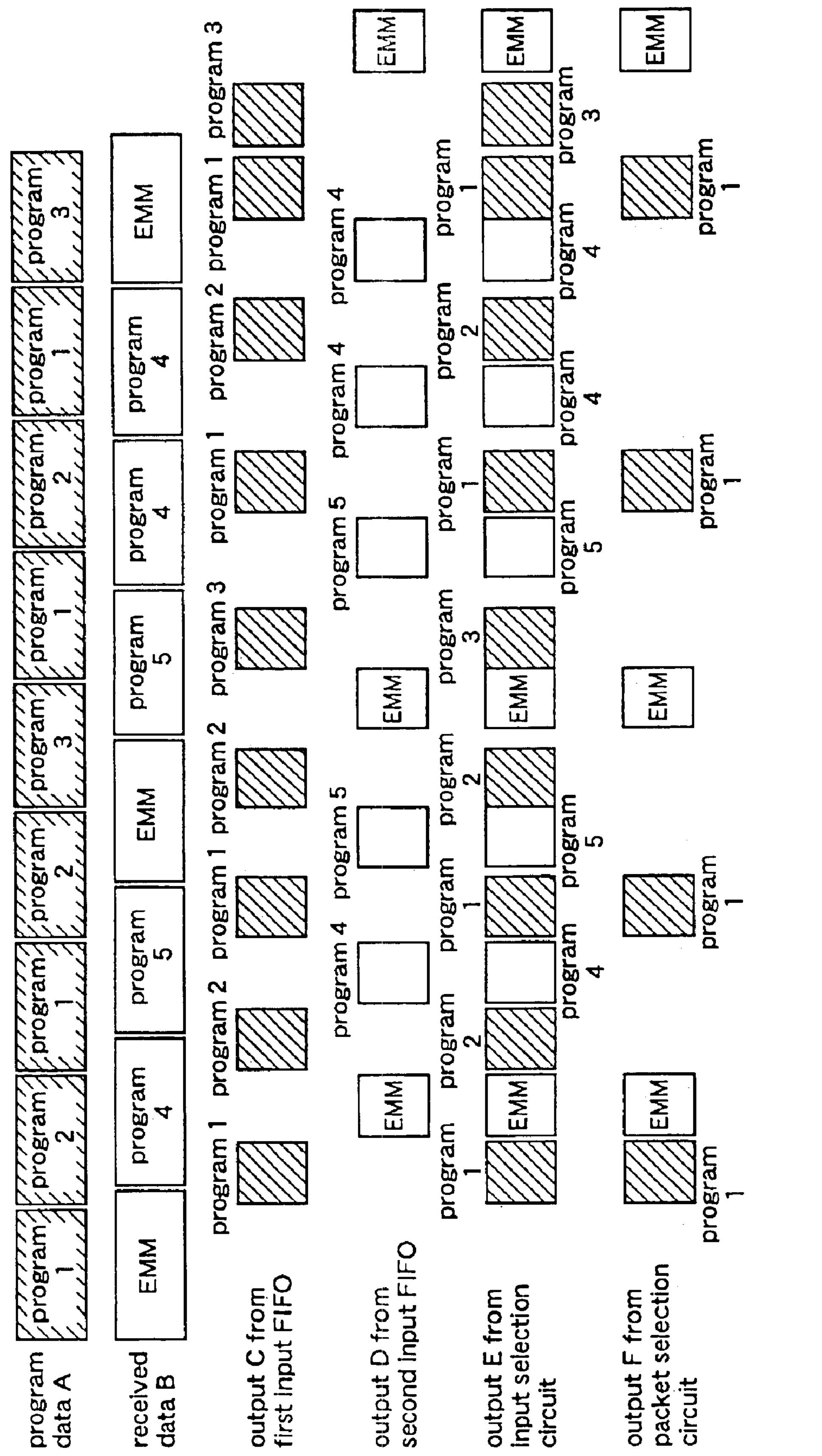
FIG. 3 is a diagram for explaining the operation of the packet parallel receiving circuit shown in FIG. 2.

FIG. 3 is a diagram for explaining the operation of the packet parallel receiving circuit 340 show in FIG. 2. In FIG. 3, to simplify the description, "program data A" is illustrated as broadcast data comprising three kinds of packets, "program 1", "program 2" and "program 3", but actually the program data A further includes packets of "EMM" such as key information required for displaying the respective programs. Each program comprises video and audio packets. Further, although "received data B" includes packets of "EMM", it may include packets of, other required data such as mails and program tables.

The operation of the receiving apparatus 300 will be described for the case where broadcast data from the digital satellite broadcast antenna 100 and broadcast data reproduced from the recording medium of the digital VTR 200 are received simultaneously, that is, while playing back the digital VTR 200, information that is to be obtained is received from broadcast data transmitted in a digital satellite broadcast.

Initially, the broadcast data reproduced by the digital VTR 200 is input to the Second receiving circuit 320 of the receiving apparatus 300. On the other hand, the broadcast data received by the digital satellite broadcast antenna 100 is input to the first receiving circuit 310 of the receiving apparatus 300.

Then, the first receiving circuit 310 outputs the input broadcast data, as received data B, to the packet parallel receiving circuit 340, while the second receiving circuit 320 outputs the input broadcast data, as program data A, to the packet parallel receiving circuit 340. For example, as shown in FIG. 3, the former is output as "program data A" in which packets of "program 1", "program 2" and "program 3" are arranged at random, and the latter is output as "received data B" in which packets of "EMM", "program 4", and "program 5" are arranged at random.

In the packet parallel receiving circuit 340, the received data B from the first receiving circuit 310 is stored in the first input FIFO 341 while the program data A from the second receiving circuit 320 is stored in the second input FIFO 342.

When at least one packet of data is stored in each of the first FIFO 341 and the second FIFO 342, each of these FIFOs output a read request to the input selection circuit 343.

In response to the read request from the first FIFO 341, the input selection circuit 343 reads the packets of the received data B from the first input FIFO 341. Further, in response to the read request from the second FIFO 342, the input selection circuit 343 reads the packets of the program data A from the second FIFO 342. These packets are output to the packet selection circuit 344. At this time, the output packets are distinguished by only packet identifiers (PIDs). Since the packets supplied from different digital broadcast input sources having the same PID cannot be distinguished, the input selection circuit 343 makes a distinction between the packets read from the program data A and the packets read from the received data B when outputting the packets.

The packet reading rate is twice or more as high as the higher data writing rate into the first FIFO 341 or the data writing rate into the second FIFO 342. Thereby, the packets of both the program data A and the received data B can be read without omission. When the readout of packets from the second FIFO 342 is performed prior to the readout of packets from the first FIFO 341, even if the reading rate is not twice or more as high as the higher writing rate, at least the packets of the program data A can be read without omission to display the program. In this case, although the packets of the received data B cannot be completely read, since the packets containing EMM are transmitted repeatedly with respect to the packets of the same content, some omission is negligible.

In the packet parallel receiving circuit 340, as shown in FIG. 3 by "output C from first input FIFO", "output D from second input FIFO", and "output E from input selection circuit", when data of at least one packet of "program 1" is stored in the first input FIFO 341, the input selection circuit 343 reads the packet of "program 1" in response to a read request from the FIFO 341, and outputs it to the packet selection circuit 344. When data of at least one packet of "EMM" is stored in the second input FIFO 342, the input selection circuit 343 reads the packet of "EMM" in response to a read request from the FIFO 342, and outputs it to the packet selection circuit 344. Accordingly, the packets read from the first and second input FIFOs 341 and 342 are multiplexed timewise when they are output from the input selection circuit 343.

Next, the packet selection circuit 344 selects, from the Program data A, packets relating to a program to be viewed by the viewer, i.e., packets containing video information and audio information relating to the program to be viewed (program broadcast data). Further, the packet selection circuit 344 selects, from the received data B, packets containing information relating to a program to be viewed by the viewer, i.e., packets containing EMM such as key information for decoding coded data of the program to be viewed. For example, in FIG. 3, as shown by "output E from input selection circuit" and "output F from packet selection circuit", amongst the packets relating to "program 1", "program 2" and "program 3", which are arranged at random in the program data A, only the packets containing data of the program to be viewed (in this case, "program 1") are selected. Further, amongst the packets relating to "EMM", "program 4", and "program 5" which are arranged at random in the received data B, only the packets containing "EMM" are selected. The program to be viewed by the viewer is informed by the CPU 370 to the packet selection circuit 344 in the packet parallel receiving circuit 340.

The data extraction circuit 345 extracts the video and audio information from the packets which contain the program broadcast data and are selected by the packet selection circuit 340, and extracts the EMM from the packets which contain the EMM in order to output these data to the memory access circuit 350. In order to decode the coded video and audio information, a decoding key set by the CPU 370 is employed, and the decoded information is transmitted to the memory access circuit 350.

The memory access circuit 350 stores the program broadcast data relating to the program to be viewed and the EMM, which are extracted by the data extraction circuit 345, in the memory 360.

The AV expansion circuit 380 reads the program broadcast data (video and audio information) stored in the memory 360 by using the memory access Circuit 350, expands these data, and outputs the expanded data to the television receiver 400.

The television receiver 400 displays and outputs a video signal and an audio signal processed by the AV expansion circuit 380, respectively.

Further, according to the operation of the viewer, the CPU 370 reads the mail information or the information relating to the operation of the receiving apparatus 300 from the memory 360 by using the memory access circuit 350, reproduces the information in the AV expansion circuit 380, and displays the reproduced information on the television receiver 400.

When playback of the digital VTR 200 is ended and a digital satellite broadcast is received through the digital satellite broadcast antenna 100, the CPU 370 reads the key information for decoding from the memory 360 by using the memory access circuit 350, and uses this key information for decoding the coded digital broadcast received through the antenna 100.

As described above, the receiving apparatus 300 of this first embodiment receives broadcast data from two kinds of digital broadcast input sources, and outputs these data to the packet parallel receiving circuit 340 having two input FIFOs 341 and 342 which temporarily store the respective broadcast data. When at least one packet of data is stored in each of the two input FIFOs 341 and 342, the input selection circuit 343 successively takes the packets from the input FIFOs 341 and 342, and the packet selection circuit 344 selects, from these packets, only packets containing information relating to the program to be viewed and packets containing EMM. Therefore, the receiving apparatus 300 displays the broadcast program desired by the viewer on the television receiver 400 so that the viewer can watch it and, simultaneously, receives the required data which is to be obtained even when the viewer does not watch the digital broadcast including the required data (e.g., a decoding key and a mail to the viewer transmitted in a digital broadcast received by the digital satellite broadcast antenna 100). Therefore, it is possible to avoid a lack of required information when the viewer resumes watching the digital broadcast which has not been viewed and an omission of a mail to the viewer transmitted in the digital broadcast which is not viewed.

Since the broadcast data from which the information relating to the program to be viewed are those which are reproduced by the digital VTR 200, the receiving apparatus 300 displays the program included in the broadcast data recorded in the recording medium of the digital VTR 200 so that the viewer can watch it and, simultaneously, receives necessary information transmitted in the digital broadcast which is not viewed. Therefore, it is possible to avoid a lack of information required when the viewer resumes watching the digital broadcast and an omission of a mail to the viewer which is transmitted in the digital broadcast while the viewer watches the program reproduced by the digital VTR 200.

Further, since the packet reading rate of the input selection circuit 343 is twice or more as high as the higher one between the data writing rate to the first FIFO 341 and the data writing rate to the second FIFO 342, the packets to be extracted from the two kinds of input data are completely extracted without omission.

Furthermore, when at least one packet is stored in the first input FIFO 341 or the second input FIFO 342 (input storage means which temporarily stores program broadcast data), the input selection circuit 343 (input selection means) selects the input FIFO with priority to take the packets stored in the FIFO. Therefore, the packets relating to the program to be viewed are read without omission to display the program.

Further, required data (e.g., a program table, a mail to the viewer, etc.) of a program broadcast which is obtained while receiving broadcast data of another program broadcast can be used by the CPU to control the receiver when it receives broadcast data of the program broadcast, or to provide the viewer with the program table or the mail. Further, even when the viewer watches a program (broadcast), the latest program table or a mail to the viewer transmitted in another broadcast received can be overlapped with the program being viewed, or it can be displayed by interrupting the display of the program being viewed.

In this first embodiment, emphasis has been placed on the case where information transmitted in a digital satellite broadcast is received while playing back the digital VTR. However, this first embodiment is also applicable to a case where information transmitted in a digital broadcast is received while receiving another digital broadcast. Further, this first embodiment is not restricted to the case where broadcast data supplied from two kinds of digital broadcast input sources are received in parallel. That is, parallel receiving of broadcast data from three or more input sources is also possible by providing the apparatus with three or more FIFOs and an input selection circuit adapted to these inputs. In this case, the input selection circuit reads data at a rate which is obtained by multiplying the maximum value of the data writing rates to the plural input FIFOs by the number of the input FIFOs, whereby unwanted omission of packets is avoided.

Furthermore, in this first embodiment, emphasis has been placed on the case where information which is included in a digital broadcast and is to be received even when the viewer does not watch the program of the digital broadcast is EMM. However, the information is not restricted to EMM. Other information that is required for the operation of the receiving apparatus, such as a program table, may be received while the viewer watches another broadcast.

Moreover, in this first embodiment, the packet parallel receiving circuit 340 shown in FIG. 2 includes, as input FIFOs for storing input data, two separated input FIFOS, i.e., the first input FIFO 341 Which stores the received data B supplied from the first receiving circuit 310 and the second input FIFO 342 which stores the program data A supplied from the second receiving circuit 320. However, these two input FIFOs 341 and 342 may be implemented by using one memory and defining two storage areas for these input FIFOs in the memory. Further, in the case where broadcast data from three or more digital broadcast input sources are received in parallel, it is possible to implement input FIFOs for temporarily storing these input broadcast data, as three or more FIFO areas in one memory.

[Second Embodiment]

Hereinafter, a description will be given of a receiving apparatus 500 according to a second embodiment of the invention, with reference to FIGS. 4–6. The receiving apparatus 500 is obtained by adding an input switching circuit 530 to the structure of the receiving apparatus 300 of the first embodiment and altering part of the structure of the packet parallel receiving circuit 340.

Figure 4:
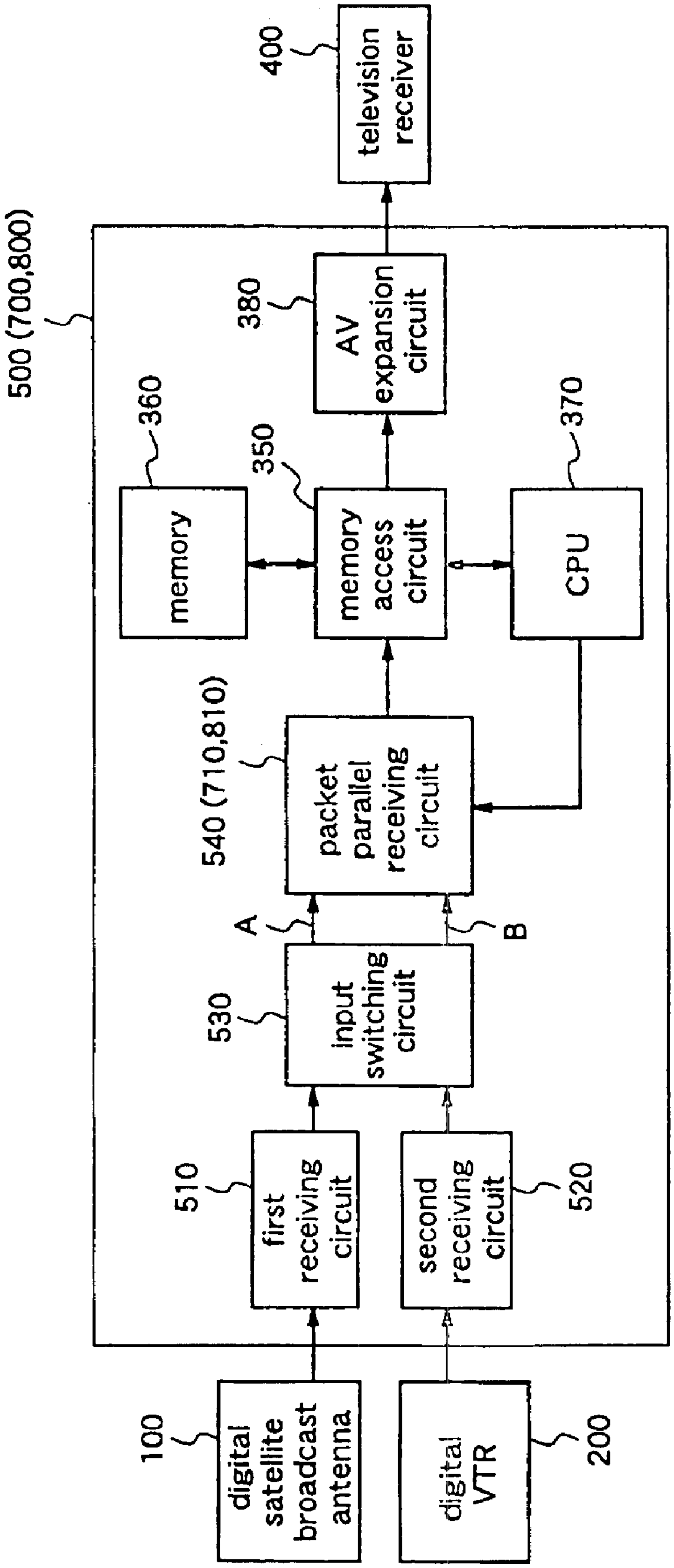
FIG. 4 is a block diagram illustrating the structure of a digital broadcast data receiving apparatus according to the second and third embodiments of the invention.

FIG. 4 is a block diagram illustrating the structure of the receiving apparatus 500. In FIG. 4, the same reference numerals as those shown in FIG. 1 denote the same or corresponding parts and, therefore, do not require repeated description. Only those components different from those shown in FIG. 1 will be described hereinafter.

A first receiving circuit 510 receives broadcast data received by a digital satellite broadcast antenna 100, and outputs the data to an input switching circuit 530.

A second receiving circuit 520 receives broadcast data reproduced by a digital VTR 200, and outputs the data to the input switching circuit 530.

On receipt of the two pieces of broadcast data output from the first and second receiving circuits 510 and 520, the input switching circuit 530 outputs one of these broadcast data which is to be viewed, as program data A, and the other broadcast data, as received data B, to a packet parallel receiving circuit 540. In this second embodiment, the input switching circuit 530 outputs the broadcast data which is output from the digital VTR 200 and includes a program to be viewed as the program data A, and outputs the broadcast data which is received by the digital satellite broadcast antenna 100 as the received data B.

The packet parallel receiving circuit 540 takes the received data B and the program data A in parallel from the input switching circuit 530 and outputs these data to a memory access circuit 350.

Next, the packet parallel receiving circuit 540 will be described in more detail.

Figure 5:
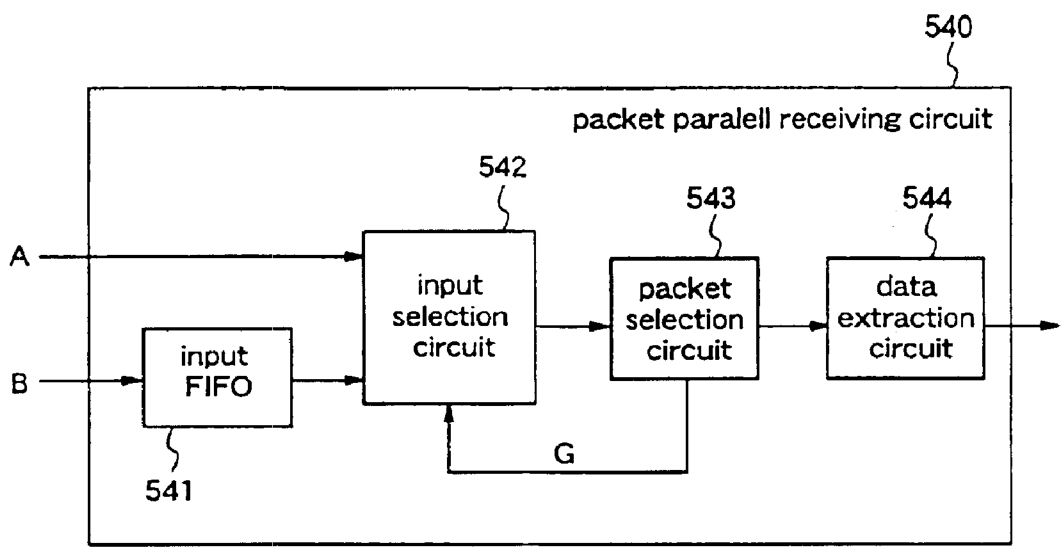
FIG. 5 is a block diagram illustrating the structure of a packet parallel receiving circuit according to the second embodiment.

FIG. 5 is a block diagram illustrating the structure of the packet parallel receiving circuit 540. Hereinafter, constituents of this circuit will be briefly described.

An input FIFO 541 successively stores the received data B output from the input switching circuit 530. The input FIFO 541 is able to store about two packets of data.

An input selection circuit 542 receives the program data A from the input switching circuit 530 and outputs the data in its normal state. When the input selection circuit 542 receives a packet selection result signal which is described later, it receives the received data B from the input FIFO 541 and outputs the data.

A packet selection circuit 543 selects packets containing program broadcast data relating to the program to be viewed from the program data A output from the input selection circuit 542. Further, it selects packets containing information to be received from the received data B.

A data extraction circuit 544 extracts the video and audio information and the required data from the packets selected by the packet selection circuit 543, and performs decoding.

Figure 6:
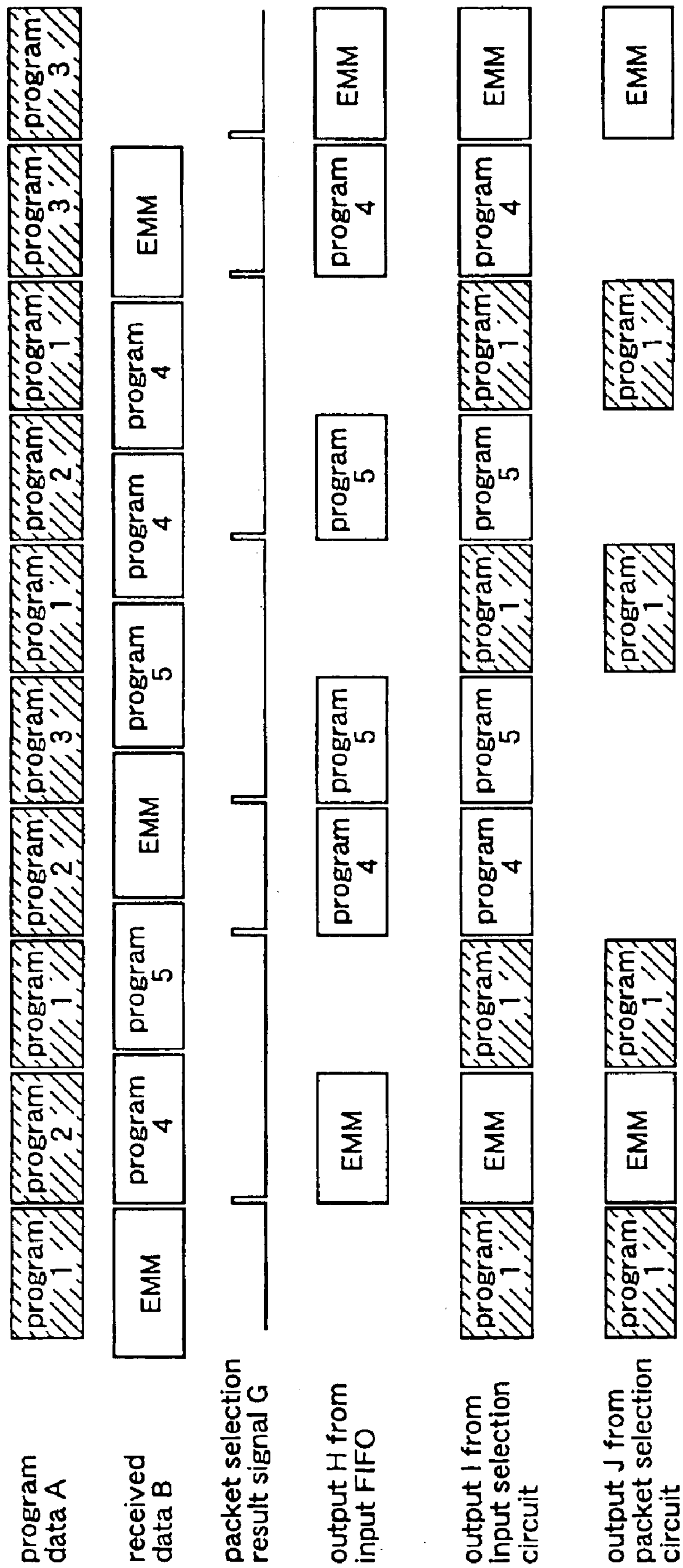
FIG. 6 is a diagram for explaining the operation of the packet parallel receiving circuit shown in FIG. 5.

The operation of the packet parallel receiving circuit 540 so constructed is shown in FIG. 6. In FIG. 6, like the description for the first embodiment shown in FIG. 3, the program data A is simplified as broadcast data comprising packets of "program 1", "program 2", and "program 3". Actually, the program data A includes packets of "EMM" such as key information required for display of the respective programs. Further, each program comprises video and audio packets.

Next, the operation of the receiving apparatus 500 will be described with reference to FIGS. 4~6. Also in this second embodiment, as in the first embodiment, the receiving apparatus 500 receives the data from the digital satellite broadcast antenna 100 simultaneously with the data from the recording medium of the digital VTR 200, i.e., it receives "EMM" from the digital broadcast received by the digital satellite broadcast antenna 100 while the viewer watches "program 1" which is played back by the digital VTR 200.

The broadcast data reproduced by the digital VTR 200 is input to the second receiving circuit 520 of the digital broadcast data receiving apparatus 500. Meanwhile, the broadcast data received by the digital satellite broadcast antenna 100 is input to the first receiving circuit 510 of the receiving apparatus 500.

The first and second receiving circuits 510 and 520 output the input broadcast data to the input switching circuit 530.

The input switching circuit 530 outputs the broadcast data from the first receiving circuit 510, as "received data B" in which packets of "EMM", "program 4", and "program 5" are arranged at random, to the packet parallel receiving circuit 540. Further, the input switching circuit 530 outputs the broadcast data from the second receiving circuit 520, as "program data A" in which packets of "program 1", "program 2", and "program 3" are arranged at random, to the packet parallel receiving circuit 540.

On receipt of the received data B and the program data A, the packet parallel receiving circuit 540 temporarily stores the received data B in the input FIFO 541, and inputs the program data A to the input selection circuit 542.

The input selection circuit 542 outputs the packets of "program 1" of the program data A, in its normal state (I in FIG. 6).

When the packets of the program data A, which are output from the input selection circuit 542, are the packets of "program 1" relating to the program to be viewed, the packet selection circuit 543 selects and outputs these packets of "program 1" (J in FIG. 6). On the other hand, when the packets of the program data A are the packets of "program 2" or "program 3" having no relation to the program to be viewed, the packet selection circuit 543 discards these packets and informs this result as a packet selection result signal (G in FIG. 6) to the input selection circuit 542.

When the input selection circuit 542 receives the packet selection result signal (G in FIG. 6) from the packet selection circuit 543 and at least one packet is stored in the input FIFO 541, the input selection circuit 542 selects the packets of "EMM" of the received data B from the input FIFO 541 (H in FIG. 6) and outputs the packets of "EMM" (I in FIG. 6). Since the input FIFO 541 can store about two packets of data as described above, the packets of the received data B (i.e., "EMM", "program 4", "program 5", "EMM", "program 5" . . . ) are successively input to the FIFO 541. However, depending on the frequency of selection by the input selection circuit 542, there occurs a problem that the FIFO 541 cannot temporarily store all the packets of the received data B and thereby Some Packets are omitted (H in FIG. 6). However, generally the packets containing "EMM" are repeatedly transmitted with respect to the same content and, therefore, some omission is negligible. Further, this problem can be easily solved by increasing the storage capacity of the input FIFO 541.

When the packets of the program data B, which are output from the input selection circuit 542, are the packets of "EMM" containing EMM, the packet selection circuit 543 selects and outputs these packets. When the packets of the program 5 data B are the packets of "program 4" or "program 5" containing no EMM, the packet selection circuit 543 discards these packets (J in FIG. 6).

On receipt of the packets output from the packet selection circuit 543, the data extraction circuit 544 takes the video and audio information relating to the program to be viewed from the packets of "program 1" containing the program broadcast data relating to the program to be viewed, and takes the EMM from the packets of "EMM".

A memory access circuit 350 stores, in a memory 360, the program broadcast data relating to the program to be viewed and the required data, which are extracted by the data extraction circuit 544.

An AV expansion circuit 380 reads the video information and the audio information stored in the memory 360 by using the memory access Circuit 350, and expands the video and audio information to be output.

A television receiver 400 displays and outputs the video signal and the audio signal expanded by the AV expansion circuit 380, respectively.

According to the operation of the viewer, a CPU 370 reads mail information or information relating to the operation of the receiving apparatus 500 from the memory 360 by using the memory access circuit 350, reproduces the information by the AV expansion circuit 380, and displays the reproduced information on the television receiver 400.

When playback of the digital VTR 200 is ended and the digital broadcast is received through the digital satellite broadcast antenna 100, the CPU 370 reads the key information for decoding which is stored in the memory 360, by using the memory access circuit 350, and uses this key for decoding the coded broadcast data.

As described above, the receiving apparatus 500 of this second embodiment receives broadcast data from two channels of digital broadcast data input sources and outputs these data to the packet parallel receiving circuit 540. In the packet parallel receiving circuit 540, the packet selection circuit 543 receives program broadcast data from the input selection circuit 542, and selects packets containing information relating to the program to be viewed to output these packets. When the packet selection circuit 543 discards other packets, it informs this effect to the input selection circuit 542. The input selection circuit 542 takes packets from the input FIFO 541, which temporarily stores the received broadcast data and outputs these packets, and the packet selection circuit 543 takes only the packets of EMM from the packets output from the input selection circuit 542. Therefore, while the viewer watches the program displayed, the receiving apparatus 500 can receive the information to be received (e.g., a decoding key, a mail to the viewer, etc.) which is transmitted in a digital broadcast that is not viewed by the viewer. Therefore, it is possible to avoid both a lack of information that is required when the viewer resumes watching the digital broadcast which has not been viewed, and an omission of a mail to the viewer transmitted in the digital broadcast which is not viewed.

Furthermore, an input FIFO for the program broadcast data, which requires a capacity for about two packets, is dispensed with, and the selection of packets from the program broadcast data and the received broadcast data is done by using a single packet selection circuit, whereby the circuit scale can be reduced. Further, in the input selection circuit, it is possible to suppress the throughput without making the processing rate higher than the data reading rate into the input FIFO.

Further, information (e.g., a program table, a mail to the viewer, etc.) of a program broadcast which is obtained while receiving broadcast data of another program broadcast can be used by the CPU to control the receiver when it receives broadcast data of the program broadcast, or to provide the viewer with the program table or the mail. Further, even when the viewer watches a program (broadcast), the latest program table or a mail to the viewer transmitted in another received broadcast can be overlapped with the program being viewed, or it can be displayed by interrupting the display of the program being viewed.

Also in this second embodiment, emphasis has been placed on the case where information transmitted in a digital broadcast received by the digital satellite broadcast antenna is received while playing back the digital VTR. However, this second embodiment is also applicable to a case where information transmitted in a digital broadcast is received while receiving another digital broadcast. Further, the second embodiment is not restricted to the case where broadcast data from two channels of digital broadcast input sources are received in parallel. Parallel receiving of broadcast data from three or more digital broadcast input sources is also possible by providing the apparatus with two or more input FIFOs, a second packet selection circuit, and an input selection circuit adapted to the plural inputs.

Furthermore, while in this second embodiment the information which is included in a digital broadcast and is to be received even when the viewer does not watch the program of the digital broadcast is EMM, it is not restricted to EMM. Other information required for the operation of the digital broadcast data receiving apparatus, such as a program table, may be received while the viewer watches another broadcast.

[Embodiment 3]

Hereinafter, a description will be given of a receiving apparatus 700 according to a third embodiment of the invention, with reference to FIGS. 4, and 7–10. The receiving apparatus 700 is obtained by altering part of the structure of the packet parallel receiving circuit 540 of the second embodiment.

Figure 7:
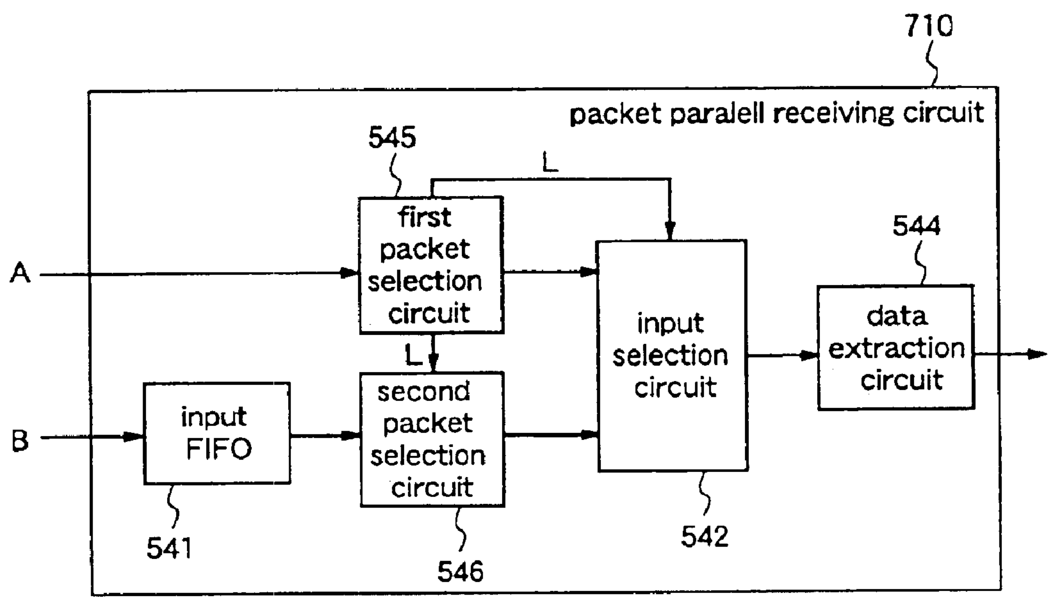
FIG. 7 is a block diagram illustrating the structure of a packet parallel receiving circuit according to the third embodiment.

Since the structure of the receiving apparatus 700 of this third embodiment is identical to that of the receiving apparatus 500 of the second embodiment, FIG. 4 is used to describe the apparatus 700. Further, FIG. 7 is a block diagram illustrating the structure of the packet parallel receiving circuit 710.

Initially, the constituents of the packet parallel receiving circuit 710 will be described. In FIG. 7, the same reference numerals as those shown in FIG. 5 denote the same or corresponding parts and, therefore, do not require repeated description.

A first packet selection circuit 545 receives the program data A from the input switching circuit 530, and outputs this to the input selection circuit 542.

A second packet selection circuit 546 receives the received data B from the input FIFO 541, and outputs this to the input selection circuit 542.

In this third embodiment, the input selection circuit 542 receives the program data A not from the input switching circuit 530 but from the first packet selection circuit 545, and outputs this to the data extraction circuit 544. Further, it receives the received data B not from the input FIFO 541 but from the second packet selection circuit 546, and outputs this to the data extraction circuit 544.

Figure 8:
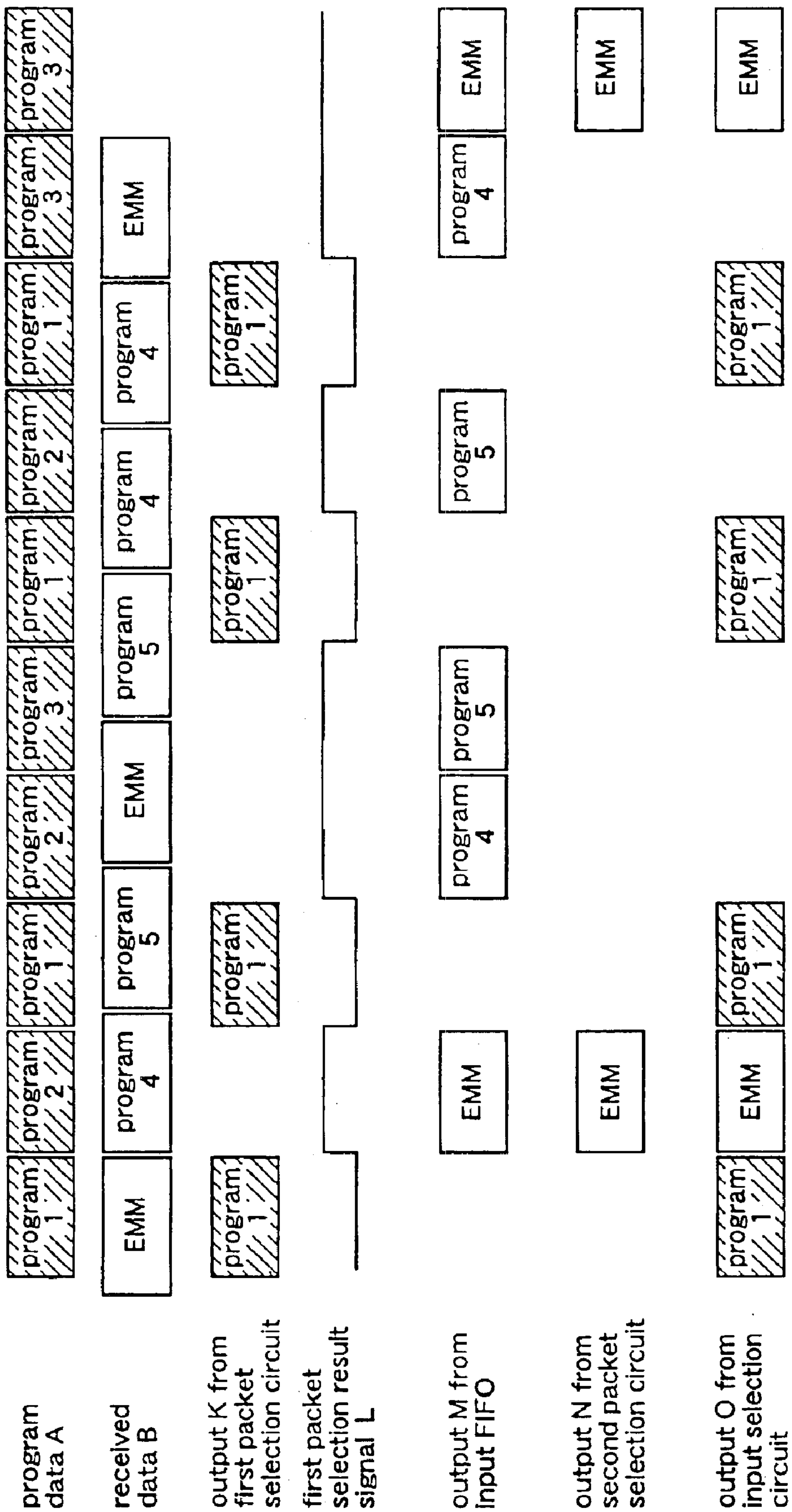
FIG. 8 is a diagram for explaining the operation of the packet parallel receiving circuit shown in FIG. 7.

The operation of the packet parallel receiving circuit 710 so constructed is shown in FIG. 8.

In FIG. 8, like the first and second embodiments, the program data A is simplified as broadcast data comprising packets of "program 1", "program 2", and "program 3". Actually, the program data A includes packets of EMM such as key information required for display of the respective programs. Further, each program comprises video and audio packets.

Next, the operation of the receiving apparatus 700 will be described with reference to FIGS. 4, 7 and 8. Also in this third embodiment, the receiving apparatus 700 receives the data from the digital satellite broadcast antenna 100 simultaneously with the data from the recording medium of the digital VTR 200, i.e., it receives "EMM" from the digital broadcast received by the digital satellite broadcast antenna 100 while the viewer watches "program 1" which is played back by the digital VTR 200.

Initially, as described for the second embodiment, the broadcast data reproduced by the digital VTR 200 is input to the second receiving circuit 520 of the receiving apparatus 700 and output from the input switching circuit 530 as program data A. Meanwhile, the broadcast data received by the digital satellite broadcast antenna 100 is input to the first receiving circuit 510 of the receiving apparatus 700 and output from the input switching circuit 530 as received data B.

The packet parallel receiving circuit 710 receives the received data B and the program data A. In the packet parallel receiving circuit 710, the received data B is temporarily stored in the input FIFO 541 while the program data A is input to the first packet selection circuit 545.

When the packets of the program data A which are output from the input switching circuit 530 are the packets of "program 1" relating to the program to be viewed, the first packet selection circuit 545 selects and outputs these packets (K in FIG. 8). On the other hand, when the packets of the program data A are the packets of "program 2" or "program 3" having no relation with the program to be viewed, the first packet selection circuit 545 discards these packets, sets a first packet selection result signal (L in FIG. 8) indicating this at "High", and outputs this signal to the input selection circuit 542 and the second packet selection circuit 546.

When the second packet selection circuit 546 receives the first packet selection result signal of "High" (L in FIG. 8) and at least one packet is stored in the input FIFO 541, the second packet selection circuit 546 selects the packets of the received data B from the input FIFO 541 (M in FIG. 8). When the selected packets are the packets of "EMM" containing EMM, the second packet selection circuit 546 outputs these packets, and when the selected packets are the packets of "program 4" or "program 5", the selection circuit 546 discards these packets (N in FIG. 8).

Depending on the frequency of selection by the second packet selection circuit 546, a problem occurs when the FIFO 541 cannot temporarily store all the packets of the received data B and, as a result, some packets of "EMM" are thereby omitted (M in FIG. 8). However, as described for the second embodiment, some omission is negligible. Further, this problem can be easily solved by increasing the storage capacity of the input FIFO 541.

When the first packet selection result signal is "Low" (L in FIG. 8), the input selection circuit 542 receives the packets of "program 1" containing the program broadcast data of the program to be viewed from the first packet selection circuit 545 and outputs these packets to the data extraction circuit 544. When the first packet selection result signal is "High" (L in FIG. 8), the input selection circuit 542 receives the packets of "EMM" from the second packet selection circuit 546, and outputs these packets to the data extraction circuit 544 (0 in FIG. 8).

The data extraction circuit 544 extracts the video and audio information from the packets output from the input selection circuit 542 and, if the information is coded, it decodes the coded information. Further, the data extraction circuit 544 extracts the EMM and other information and outputs them.

Thereafter, as described for the second embodiment, the memory access circuit 350 stores, in the memory 360, the information relating to the program to be viewed and the EMM such as key information, which are extracted by the data extraction circuit 544. The AV expansion circuit 380 reads the video and audio information stored in the memory 360 by using the memory access circuit 350, and expands the information to be output.

According to the operation of the viewer, the CPU 370 reads mail information or information relating to the operation of the receiving apparatus 700 from the memory 360 by using the memory access circuit 350, reproduces the information by the AV expansion circuit 380, and displays the reproduced information on the television receiver 400.

When playback of the digital VTR 200 is ended and the digital satellite broadcast is received, the CPU 370 reads the key information for decoding from the memory 360 by using the memory access circuit 350, and uses this key information for decoding the coded broadcast data.

Hereinafter, a receiving apparatus 800 according to a modification of the third embodiment, in which part of the packet parallel receiving circuit 710 is altered, will be described with reference to FIGS. 4 and 9.

Since the structure of the receiving apparatus 800 of this modification is identical to that of the receiving apparatus 500 of the second embodiment, FIG. 4 is used to describe the apparatus 800. Further, FIG. 9 is a block diagram illustrating the structure of a packet parallel receiving circuit 810 according to the modification.

Figure 9:
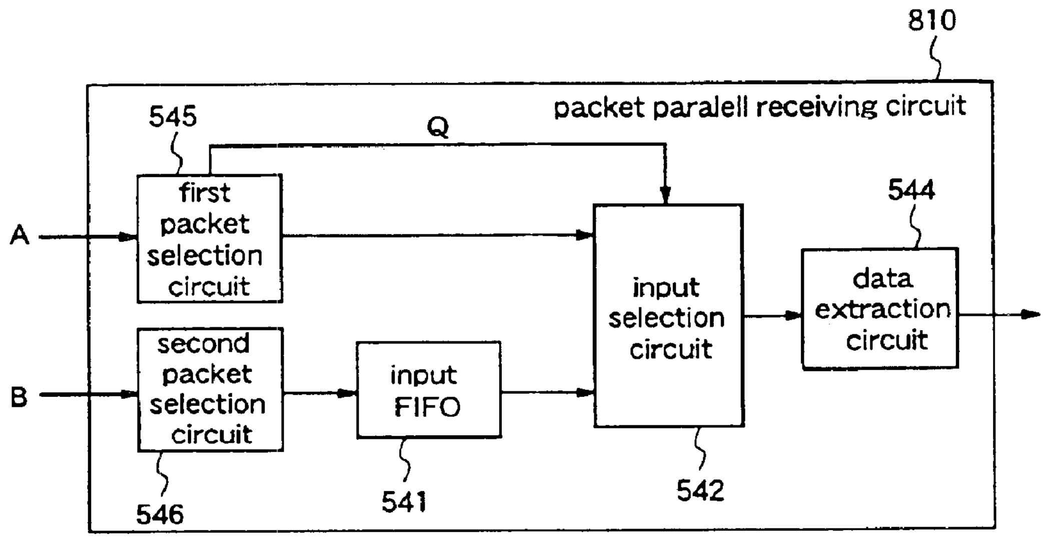
FIG. 9 is a block diagram illustrating the structure of a packet parallel receiving circuit according to a modification of the third embodiment.

In FIG. 9, the same reference numerals as those shown in FIG. 7 denote the same or corresponding parts. The constituents of the packet parallel receiving circuit 810 are identical to those of the packet parallel receiving circuit 710 shown in FIG. 7. However, in FIG. 9, the positions of the second packet selection circuit 546 and the input FIFO 541 are different from those in FIG. 7. To be specific, the second packet selection circuit 546 receives the received data B not from the input FIFO 541 but from the input switching circuit 540, and outputs the data to the input FIFO 541. The input FIFO 541 receives the received data B not from the input switching circuit 540 but from the second packet selection circuit 546, and outputs the data to the input selection circuit 542. Further, the first packet selection circuit 545 does not output the first packet selection result signal to the second packet selection circuit 546.

Figure 10:
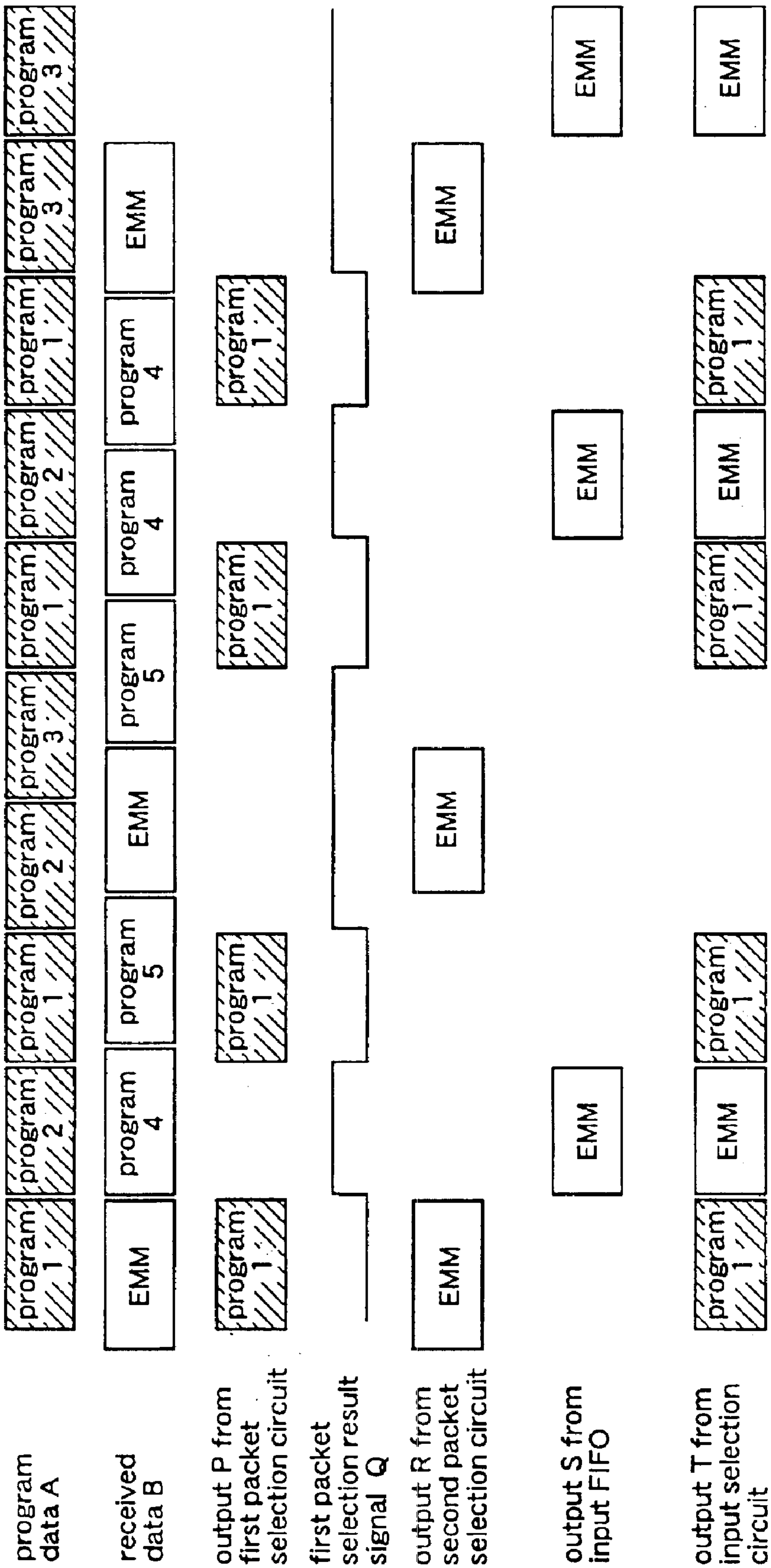
FIG. 10 is a diagram for explaining the operation of the packet parallel receiving circuit shown in FIG. 9.

The operation of the packet parallel receiving circuit 810 so constructed is illustrated in FIG. 10.

In FIG. 10, as described for the third embodiment shown in FIG. 8, the program data A is simplified, and each program comprises video and audio packets.

Next, the operation of the receiving apparatus 800 will be described with reference to FIGS. 4, 9 and 10, placing emphasis on the operation of the packet parallel receiving circuit 810 shown in FIG. 9.

The received data B and the program data A are input to the packet parallel receiving circuit 810 shown in FIG. 9 in the same manner as described for the packet parallel receiving circuit 710 shown in FIG. 7. However, the program data A and the received data B are input to the first packet selection circuit 545 and the second packet selection circuit 546, respectively.

When the packets of the input program data A are the packets of "program 1" relating to the program to be viewed, the first packet selection circuit 545 selects and outputs these packets (P in FIG. 10). When the packets of the program data A are the packets of "program 2" or "program 3" having no relation to the program to be viewed, the first packet selection circuit 545 discards these packets, and outputs a first packet selection result signal (Q in FIG. 10) indicating this to the input selection circuit 542.

On the other hand, when the packets of the input received data B are the packets of "EMM" containing EMM, the second packet selection circuit 546 temporarily stores these packets in the input FIFO 541. When the packets of the received data B are the packets of "program 4" or "program 5", the second packet selection circuit 546 discards these packets (R in FIG. 10).

When the first packet selection circuit 545 selects the packets relating to "program 1", i.e., when the first packet selection result signal is "Low" (Q in FIG. 10), the input selection circuit 542 receives the packets of "program 1" containing the program broadcast data of the program to be viewed from the first packet selection circuit 545, and outputs these packets to the data extraction circuit 544 (T in FIG. 10). When the first packet selection result signal is "High" (Q in FIG. 10) and at least one packet of data is stored in the input FIFO 541, the input selection circuit 542 reads the packets of "EMM" from the input FIFO 541 (S in FIG. 10), and outputs these packets to the data extraction circuit 544 (T in FIG. 10).

Thereafter, video information and audio information are displayed and output in the same manner as described for the case of using the packet parallel receiving circuit 710 shown in FIG. 7. Further, mail information or information relating to the operation of the receiving apparatus 800 are also displayed. Furthermore, when receiving the digital satellite broadcast, coded broadcast data can be decoded by using key information for decoding.

As described above, the receiving apparatus 800 of this third embodiment receives broadcast data supplied from two kinds of digital broadcast data input sources, and outputs these data to the packet parallel receiving circuit. In the packet parallel receiving circuit, the input selection circuit receives the packets of information relating to the program to be viewed, which are taken from the program broadcast data in the first packet selection circuit, and outputs these packets. when other packets are discarded in the first packet selection circuit, the second packet selection circuit takes only packets of EMM from the packets stored in the input FIFO which temporarily stores the received broadcast data, and outputs these packets to the input selection circuit. Therefore, while the viewer watches the program displayed, the receiving apparatus 800 can receive the information to be received (e.g., a decoding key, a mail to the viewer, etc.) which is transmitted in a digital broadcast that is not viewed by the viewer. Therefore, it is possible to avoid a lack of information required when the viewer resumes watching the digital broadcast which has not been viewed, and an omission of a mail to the viewer transmitted in the digital broadcast which is not viewed is avoided. Further, the input FIFO for the program broadcast data, which requires a capacity for about two packets, can be dispensed with, whereby the circuit scale can be reduced.

Furthermore, in the packet parallel receiving circuit, the input FIFO temporarily stores the packets of EMM which are taken from the received broadcast data in the second packet selection circuit, and the input selection circuit outputs the packets of information relating to the program to be viewed which are taken from the program broadcast data in the first packet selection circuit. When other packets are discarded in the first packet selection circuit, the input selection circuit selects the packets stored in the input FIFO to output these packets. In this way, only required packets are selected and then these packets are temporarily stored in the input FIFO, whereby unwanted overflow of packets from the input FIFO is avoided even when the number of the packets relating to the program to be viewed increases. Therefore, the information to be obtained is received with high reliability.

Further, required information (e.g., a program table, a mail to the viewer, etc.) of a program broadcast which is obtained while receiving broadcast data of another program can be used by the CPU to control the receiver when receiving broadcast data of the program broadcast or to provide the viewer with the program table or the mail. Further, even when the viewer watches a program (a broadcast), the latest program table or a mail to the viewer transmitted in another broadcast received can be overlapped with the program being viewed, or it can be displayed by interrupting display of the program being viewed.

Also in this third embodiment, emphasis has been placed on the case where information transmitted in a digital satellite broadcast is received while playing back the digital VTR. However, this third embodiment is also applicable to a case where information transmitted in a digital broadcast is received while receiving another digital broadcast. Further, this third embodiment is not restricted to the case where broadcast data from two kinds of digital broadcast input sources are received in parallel. Parallel receiving of broadcast data from three or more digital broadcast input sources is also possible by providing the apparatus with two or more (second to n-th ($n \geqq 3$)) packet selection circuits, input FIFOs respectively connected to these packet selection circuits, and an input selection circuit adapted to the plural inputs.

Furthermore, when broadcast data from three or more digital broadcast input channels are received in parallel in the receiving apparatus shown in FIG. 7, the second to n-th packet selection circuits and the input selection circuit, to which the (first packet selection result signal L indicating that packets are discarded in the first packet selection circuit, should perform as follows. That is, in the second to n-th packet selection circuits, when at least one packet is stored in each of the corresponding input FIFOs, these packets are taken from the input FIFOs to select the packets of EMM. Further, the input selection circuit selects one from the second to n-th packet selection circuits which have selected the packets of EMM, and takes the packets from the selected packet selection circuit. The packet selection circuit, which has selected the packets of EMM but is not selected by the input selection circuit, does not select the next packet even if the first packet selection result signal L is input, and stands by until it is selected by the input selection circuit. Accordingly, the packets selected by the second to n-th packet selection circuits can be input to the input selection circuit with high reliability.

Furthermore, while in this third embodiment the information which is included in a digital broadcast and is to be received even when the viewer does not watch the program of the digital broadcast is EMM, it is not restricted to EMM. Other information required for the operation of the digital broadcast data receiving apparatus, such as a program table, may be received while the viewer watches another broadcast.

[Embodiment 4]

Hereinafter, a description will be given of a receiving apparatus 900 according to a fourth embodiment of the invention, which is available to recording of a program on a different channel by using a VTR.

Figure 11:
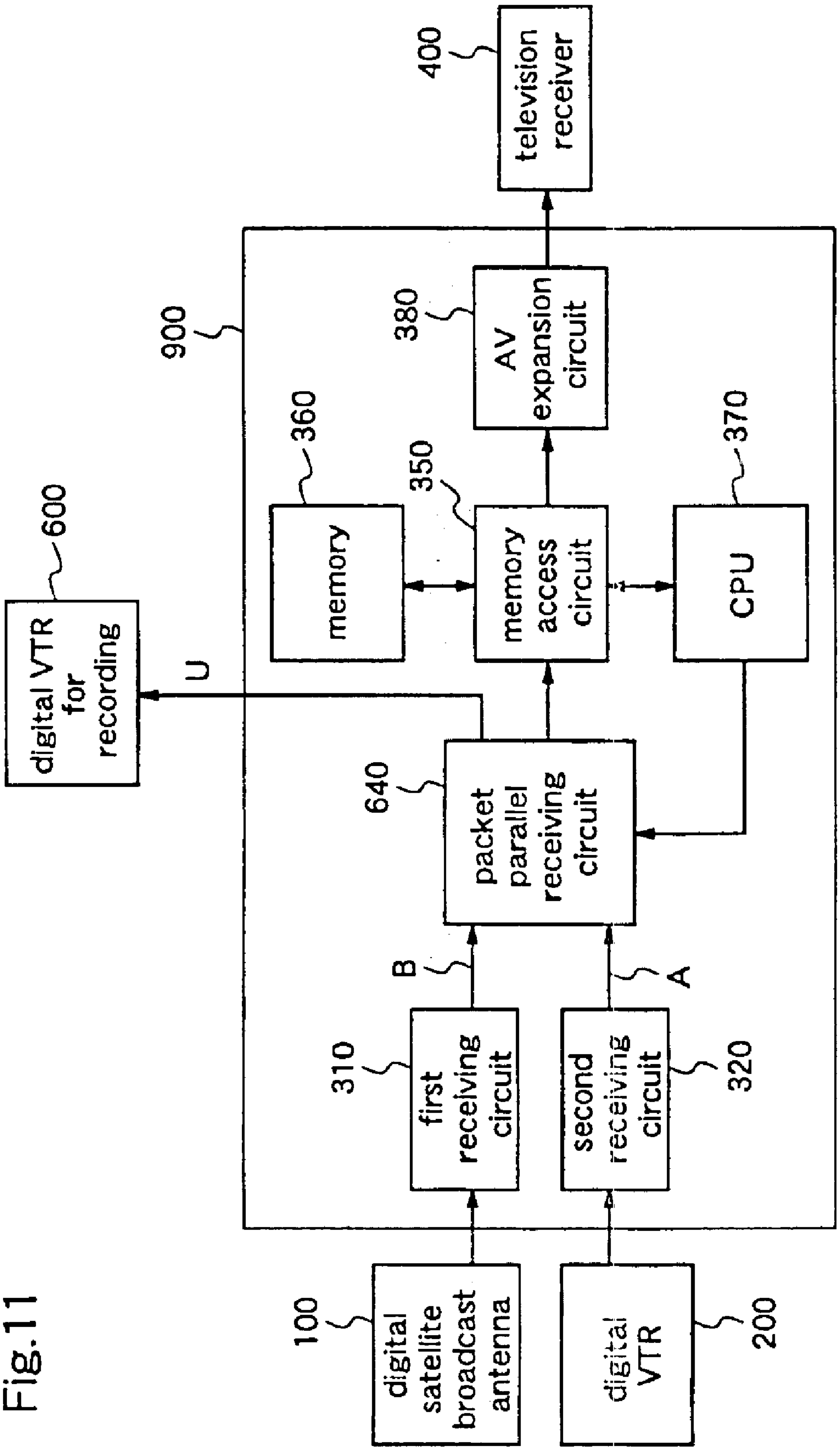
FIG. 11 is a block diagram illustrating the structure of digital broadcast data receiving apparatus according to a fourth embodiment of the present invention.

FIG. 11 is a block diagram illustrating the structure of the receiving apparatus 900. The receiving apparatus 900 will be described with reference to FIG. 11. In FIG. 11, the same reference numerals as those shown in FIG. 1 denote the same or corresponding parts and, therefore, do not require repeated description. Reference numeral 600 denotes a digital VTR for recording, and 640 denotes a packet parallel receiving circuit.

The packet parallel receiving circuit 640 receives the received data B and the program data A from the first receiving circuit 310 and the second receiving circuit 320, respectively, takes data from the received data B and data from the program data A in parallel, and outputs these data to the memory access circuit 350.

The digital VTR for recording 600 records the received data output from the packet parallel receiving circuit 640.

The memory access circuit 350 writes the program data output from the packet parallel receiving circuit 340 in the memory 360.

The memory 360 stores the program data written by the memory access circuit 350.

Figure 12:
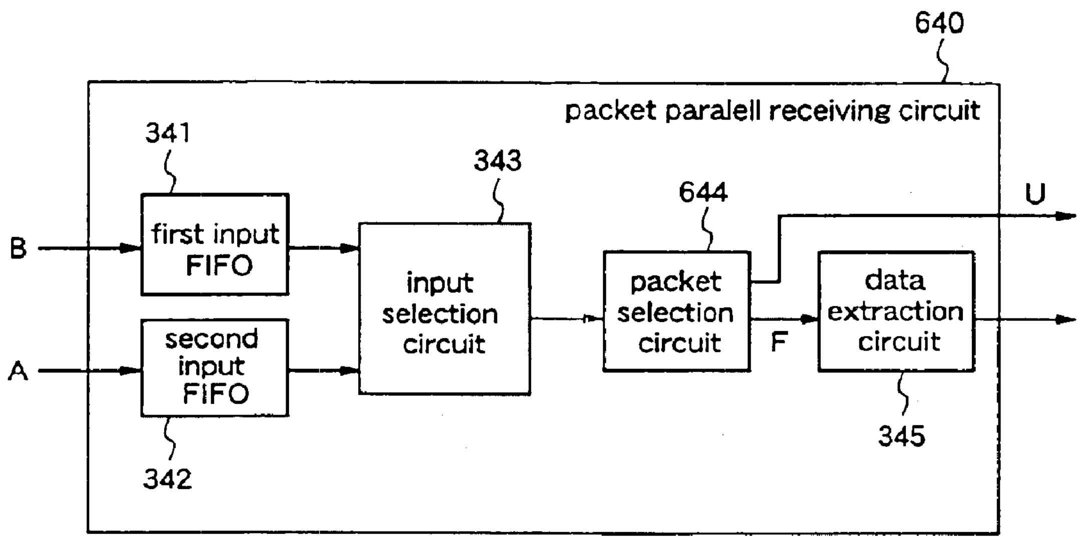
FIG. 12 is a block diagram illustrating the detailed structure of a packet parallel receiving circuit shown in FIG. 11.

Next, the packet parallel receiving circuit 640 will be described in more detail by using FIG. 12 which illustrates a block diagram of the packet parallel receiving circuit 640. In FIG. 12, the same reference numerals as those shown in FIG. 2 denote the same or corresponding parts and, therefore, do not require repeated description. Reference numeral 644 denotes a packet selection circuit.

The packet selection circuit 644 selects packets containing program broadcast data relating to a program to be viewed from the program data A to outputs the packets to the data extraction circuit 345, and selects packets containing program broadcast data relating to a program to be recorded to output the packets to the digital VTR 700.

The data extraction circuit 345 extracts video and audio information and other information from the packets selected by the packet selection circuit 344, and performs decoding and the like.

Figure 13:
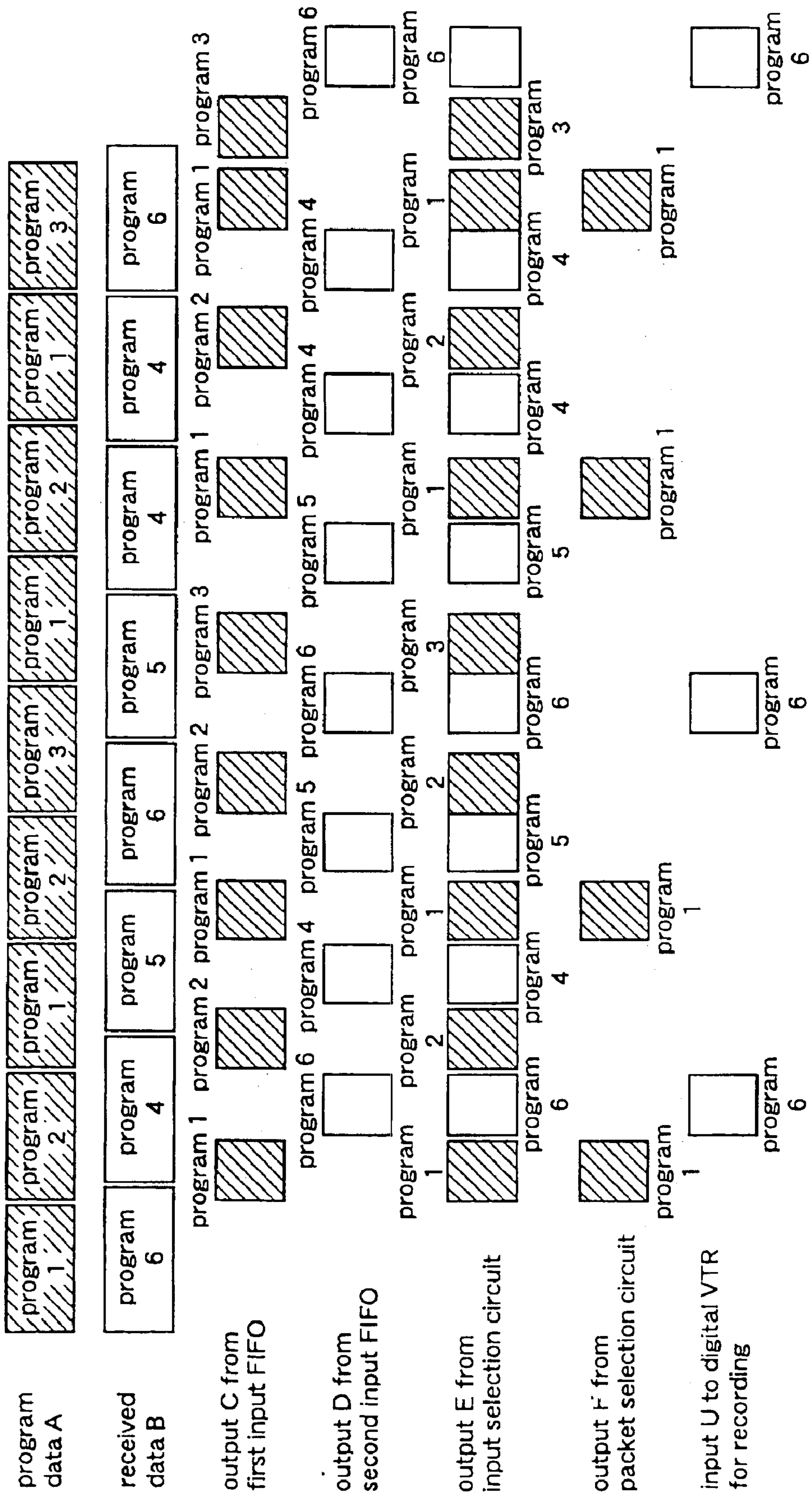
FIG. 13 is a diagram for explaining the operation of the packet parallel receiving circuit shown in FIG. 12.

The operation of the receiving apparatus 900 so constructed will be described with reference to FIG. 13. FIG. 13 is a diagram for explaining the operation of the packet parallel receiving circuit 640 shown in FIG. 12. In FIG. 13, the program data A is illustrated as broadcast data comprising packets of "program 1", "program 2", and "program 3" for simplification. Actually, the program data A further includes packets of EMM such as key information required for display of the respective programs. Further, each program comprises video and audio packets. Likewise, the received data B is illustrated as broadcast data comprising packets of "program 4", "program 5", and "program 6", but actually the received data 3 further includes packets of EMM such as key information required for display of the respective programs. Further, each program comprises video and audio packets.

In this fourth embodiment, the receiving apparatus 900 receives data from the digital satellite broadcast antenna 100 and data from the recording medium of the digital VTR at the same time, and the program of the digital broadcast received through the digital satellite broadcast antenna is recorded while playing back the digital VTR 200.

The broadcast data reproduced by the digital VTR 200 is input to the second receiving circuit 320 of the receiving apparatus 900. Meanwhile, the broadcast data received by the digital satellite broadcast antenna 100 is input to the first receiving circuit 310 of the receiving apparatus 900.

The first and second receiving circuits 310 and 320 output the input broadcast data to the input switching circuit 530 as "received data B" and "program data A", respectively. For example, as shown in FIG. 13, the program data A comprises the packets of "program 1", "program 2" and "program 3" which are arranged at random, and the received data B comprises the packets of "program 4", "program 5" and "program 6" which are arranged at random.

The packet parallel receiving circuit 640 receives the received data B and the program data A, and stores these data in the first input FIFO 341 and the second input FIFO 342, respectively.

When at least one packet of data is stored in each of the first FIFO 341 and the second FIFO 342, the FIFO outputs a read request to the input selection circuit 343.

In response to the read request from the first FIFO 341, the input selection circuit 343 reads the packets of the received data B from the first input FIFO 341. Further, in response to the read request from the second FIFO 342, the input selection circuit 343 reads the packets of the program data A from the second input FIFO 342. The input selection circuit 343 outputs these packets to the packet selection circuit 644.

At this time, the output packets are distinguished by only packet identifiers (PIDs). Since the packets supplied from different digital broadcast input sources and having the same PID cannot be distinguished, the input selection circuit 343 makes a distinction between the packets read from the program data A and the packets read from the received data B when outputting the packets. The packet reading rate is twice or more as high as the higher rate between the data writing rate into the first input FIFO 341 and the data writing rate into the second input FIFO 342. Thereby, the packets of both the program data A and the received data B can be read without omission.

For example, in FIG. 13, as shown by "output C from first input FIFO", "output D from second input FIFO", and "output E from input selection circuit", when data of at least one packet of "program 1" is stored in the first input FIFO 341, the input selection circuit 343 reads the packet of "program 1 from the first input FIFO 341 in response to a read request from the FIFO 341, and outputs it to the packet selection circuit 644. When data of at least one packet of "program 6" is stored in the second input FIFO 342 and so the FIFO 342 outputs a read request, the input selection circuit 343 reads the packet of "program 6" from the second FIFO 342, and outputs it to the packet selection circuit 644.

Accordingly, the packets read from the first and second input FIFOs 341 and 342 are multiplexed timewise when they are output from the input selection circuit 343.

Next, the packet selection circuit 644 selects, from the program data A, packets containing program broadcast data relating to the program to be viewed, i.e., packets containing video and audio information relating to the program to be viewed, and packets containing EMM of the program, such as key information for decoding. Further, the packet selection circuit 644 selects, from the received data B, packets relating to the program to be recorded.

For example, in FIG. 13, as shown by "output E from input selection circuit" and "outputs F and U from packet selection circuit", from the packets of the program data A which are arranged at random like "program 1", "program 2", "program 1", "program 2", "program 3" . . . , the packet selection circuit 644 selects the packets containing the program broadcast data and the EMM of the program to be viewed (in this embodiment, "program 1") and the corresponding EMM, and outputs the selected packets to the data extraction circuit 345. Further, from the packets of the received data B which are arranged at random like "program 6", "program 4", "program 5", "program 6", "program 5" . . . , the packet selection circuit 644 selects the packets containing the program broadcast data and the EMM of the program to be recorded (in this embodiment, "program 6"), and outputs the selected packets to the digital VTR for recording 600.

The program to be viewed and the program to be recorded, which are selected by the user, are posted to the packet selection circuit 644 in the packet parallel receiving circuit 640 by the CPU 370.

The data extraction circuit 345 extracts the video and audio information from the selected packets relating to the program to be viewed, and extracts the EMM from the packets containing the EMM. When the video and audio information are coded, the data extraction circuit 345 decodes the coded information by using a decoding key set by the CPU 370.

The memory access circuit 350 stores the information relating to the program to be viewed and the EMM such as key information, which are extracted by the data extraction circuit 345, in the memory 360.

The AV expansion circuit 380 reads the video and audio information stored in the memory 360 by using the memory access circuit 350, expands the information, and outputs the expanded information to the television receiver 400.

The television receiver 400 displays and outputs the video signal and the audio signal expanded by the AV expansion circuit 380.

Further, according to the operation of the viewer, the CPU 370 reads the mail information or the information relating to the operation of the receiving apparatus 900 from the memory 360 by using the memory access circuit 350, reproduces the information by the AV expansion circuit 380, and displays the reproduced information on the television receiver 400.

When playback of the digital VTR 200 is ended to receive the digital broadcast through the digital satellite broadcast antenna 100, the CPU 370 reads the key information for decoding from the memory 360 by using the memory access circuit 350, and uses this key information for decoding the coded broadcast data.

On the other hand, the packets constituting "program 6" are recorded in the digital VTR 700. Thereby, "program 6" which is received by the digital satellite broadcast antenna 100 can be recorded while the viewer watches "program 1" supplied from the digital VTR 200.

In this way, the receiving apparatus 900 of this fourth embodiment receives broadcast data from two input sources of digital broadcasts and outputs these data to the packet parallel receiving circuit 640 having two input FIFOs 341 and 342 which temporarily Store the respective input broadcast data. When at least one packet of data is stored in each of the two input FIFOs 341 and 342, the input selection circuit 343 successively takes the packets from the input FIFO, and the packet selection circuit 344 selects, from these packets, information relating to a program to be viewed and information relating to a program to be recorded. Therefore, it is possible to record a program which is transmitted in a digital broadcast that is not watched by the viewer while the viewer watches another program displayed.

Further, since the broadcast data from which information relating to the program to be viewed is taken are data reproduced by the digital VTR 200, it is possible to record a program transmitted in a digital broadcast which is not viewed while the viewer watches a program included in the broadcast data reproduced from the recording medium of the digital VTR.

Further, since the reading rate of the input selection circuit is twice or more as high as the higher one between the writing rate into the first FIFO 341 and the writing rate into the second FIFO 342, the packets to be taken from the two kinds of input data are extracted without omission.

Also in this fourth embodiment, emphasis has been placed on the case where information transmitted in a digital satellite broadcast is received while playing back the digital VTR. However, this fourth embodiment is also applicable to the case where information transmitted in a digital broadcast is received while the viewer watches another digital broadcast. Further, when information transmitted in one digital broadcast is input to both the program data and the received data, it is possible to record a program while watching another program amongst plural programs constituting one digital broadcast. Moreover, this fourth embodiment is not restricted to the case where broadcast data from two input sources of digital broadcasts are received in parallel. Parallel receiving of broadcast data from three or more digital broadcast input sources is also possible by providing the apparatus with three or more FIFOs and an input selection circuit adapted to the plural inputs. In this case, the data reading rate of the input selection circuit is obtained by multiplying the maximum value of the writing rates into the plural input FIFOs bY the number of the input FIFOs, whereby undesired omission of packets is avoided.

What is claimed is:

1. A digital broadcast data receiving apparatus comprising:

a plurality of broadcast data receivers operable to receive digital broadcast data supplied from a plurality of digital broadcast data sources, respectively, and to output the digital broadcast data;

wherein the digital broadcast data comprises program broadcast data relating to a program broadcast and data required to receive the program broadcast, and wherein the program broadcast data and the required data are multiplexed as digital data; and a packet parallel receiver operable to receive; object program broadcast data from the digital broadcast data output of one of said plurality of broadcast data receivers, the object program broadcast data being multiplexed digital broadcast data including program broadcast data relating to an object program broadcast to be viewed by a viewer; and received broadcast data output by said broadcast data receivers other than said one of said plurality of broadcast data receivers;

wherein said packet parallel receiver is operable to, in accordance with time division multiplexing, to extract from the object program broadcast data the program broadcast data relating to the object program broadcast to be viewed by the viewer, and to extract from the received broadcast data, data including information to be obtained when a viewer does not watch a broadcast; and wherein said packet parallel receiver comprises:

a plurality of input storage circuits operable to receive and temporarily store the digital broadcast data from one of the respective digital broadcast data sources, wherein the digital broadcast data comprises the program broadcast data in packet format multiplexed with the required data in packet format;

an input selection circuit operable to sequentially take the stored packets from said plurality of input storage circuits by repeating a process of selecting any of the input storage circuits in which at least one packet is stored and then taking the packet from the selected input storage circuit; and a packet selection circuit operable to select from a sequence of packets sequentially taken by said input selection circuit only packets containing the object program broadcast data and packets containing the data including the information to be obtained even when the viewer does not watch the broadcast.

2. The digital broadcast data receiving apparatus of claim 1 wherein said input selection circuit enables a process of successively taking the packets at a rate higher than a rate obtained by multiplying the maximum value of a data writing rate into said input storage circuits by the number of said input storage circuits.

3. The digital broadcast data receiving apparatus of claim 1 wherein when at least one packet containing the object program broadcast data is stored in any of said input storage circuits, said input selection circuit selects said any of said input storage circuits with priority to take the packet from said any of said input storage circuits.

4. A digital broadcast data receiving apparatus comprising:

a plurality of broadcast data receivers operable to receive digital broadcast data supplied from a plurality of digital broadcast data sources, respectively, and to output the digital broadcast data;

wherein the digital broadcast data comprises program broadcast data relating to a program broadcast and data required to receive the program broadcast, and wherein the program broadcast data and the required data are multiplexed as digital data; and a packet parallel receiver operable to receive: object program broadcast data from the digital broadcast data output of one of said plurality of broadcast data receivers, the object program broadcast data being multiplexed digital broadcast data including program broadcast data relating to an object program broadcast to be viewed by a viewer; and received broadcast data output by said broadcast data receivers other than said one of said plurality of broadcast data receivers;

wherein said packet parallel receiver is operable to, in accordance with time division multiplexing, to extract from the object program broadcast data the program broadcast data relating to the object program broadcast to be viewed by the viewer, and to extract from the received broadcast data, data including information to be obtained when a viewer does not watch a broadcast; and wherein said packet parallel receiving circuit comprises:

at least one input storage circuit operable to receive and temporarily store the digital broadcast data in packet format from a respective broadcast receiver other than said one of said broadcast receivers; and a packet selection circuit operable to: take only packets containing the object program broadcast data from the packets supplied from the digital broadcast data sources; discard packets containing data other than the object program broadcast data; take the packets stored in said input storage circuit when discarding the packets containing data other than the object program broadcast data; and discard unnecessary packets other than packets containing the information to be obtained even when the viewer does not watch the broadcast.

5. A digital broadcast data receiving apparatus comprising:

a plurality of broadcast data receivers operable to receive digital broadcast data supplied from a plurality of digital broadcast data sources, respectively, and to output the digital broadcast data;

wherein the digital broadcast data comprises program broadcast data relating to a program broadcast and data required to receive the program broadcast, and wherein the program broadcast data and the required data are multiplexed as digital data; and a packet parallel receiver operable to receive: object program broadcast data from the digital broadcast data output of one of said plurality of broadcast data receivers, the object program broadcast data being multiplexed digital broadcast data including program broadcast data relating to an object program broadcast to be viewed by a viewer; and received broadcast data output by said broadcast data receivers other than said one of said plurality of broadcast data receivers;

wherein said packet parallel receiver is operable to, in accordance with time division multiplexing, to extract from the object program broadcast data the program broadcast data relating to the object program broadcast to be viewed by the viewer, and to extract from the received broadcast data, data including information to be obtained when a viewer does not watch a broadcast; and wherein said packet parallel receiving circuit comprises:

at least one input storage circuit operable to receive and temporarily store the digital broadcast data from a respective broadcast receiver other than said one of said broadcast data receivers; and a first packet selection circuit operable to: take only packets containing the object program broadcast data from the digital broadcast data supplied from the digital broadcast data sources; discard packets containing data other than the object program broadcast data; and output packet discard information when the packets containing data other than the object program broadcast data are discarded, at least one second packet selection circuit in communication with said at least one input storage circuit, respectively, operable to: extract packets from said at least one input storage circuit when receiving the packet discard information and when said at least one input storage circuit stores at least one packet; and take, from the extracted packets, packets including the information to be obtained even when the viewer does not watch the broadcast; and an input selection circuit operable to: select said second packet selection circuit upon receipt of the packet discard information; take from said second packet selection circuit the packets that were taken by said second packet selection circuit from the extracted packets; and output the packets taken by said input selection circuit.

6. A digital broadcast data receiving apparatus comprising:

a plurality of broadcast data receivers operable to receive digital broadcast data supplied from a plurality of digital broadcast data sources, respectively, and to output the digital broadcast data;

wherein the digital broadcast data comprises program broadcast data relating to a program broadcast and data required to receive the program broadcast, and wherein the program broadcast data and the required data are multiplexed as digital data; and a packet parallel receiver operable to receive: object program broadcast data from the digital broadcast data output of one of said plurality of broadcast data receivers, the object program broadcast data being multiplexed digital broadcast data including program broadcast data relating to an object program broadcast to be viewed by a viewer; and received broadcast data output by said broadcast data receivers other than said one of said plurality of broadcast data receivers;

wherein said packet parallel receiver is operable to, in accordance with time division multiplexing, to extract from the object program broadcast data the program broadcast data relating to the object program broadcast to be viewed by the viewer, and to extract from the received broadcast data, data including information to be obtained when a viewer does not watch a broadcast; and wherein said packet parallel receiver comprises:

a first packet selection circuit operable to: take only packets containing the object program broadcast data from the digital broadcast data supplied from the digital broadcast data sources; discard packets containing data other than the object program broadcast data; and output packet discard information when the packets containing data other than the object program broadcast data other than the object program broadcast data are discarded;

at least one second packet selection circuit operable to: receive the received broadcast data containing data including information to be obtained even when the viewer does not watch the broadcast; and discard packets containing data other than the data including information to be obtained even when the viewer does not watch the broadcast;

at least one input storage circuit in communication with said at least one second packet selection circuit, respectively, operable to: receive and temporarily store the received broadcast data containing data including information to be obtained even when the viewer does not watch the broadcast; and output the received broadcast data; and an input selection circuit operable to: receive the packet discard information from said first packet selection circuit upon receipt of the packet discard information; take only the packets containing object program broadcast data from said first packet selection circuit; and output the packets taken by said input selection circuit.

7. A digital broadcast data receiving apparatus comprising:

a plurality of broadcast data receivers operable to receive digital broadcast data supplied from a plurality of digital broadcast data sources, respectively, and to output the digital broadcast data;

wherein the digital broadcast data comprises program broadcast data relating to a program broadcast and data required to receive the program broadcast, and wherein the program broadcast data and the required data are multiplexed as digital data; and a packet parallel receiver operable to receive: object program broadcast data from the digital broadcast data output of one of said plurality of broadcast data receivers, the object program broadcast data being multiplexed digital broadcast data including program broadcast data relating to an object program broadcast to be viewed by a viewer; and received broadcast data output by said broadcast data receivers other than said one of said plurality of broadcast data receivers;

wherein said packet parallel receiver is operable to, in accordance with time division multiplexing, to extract from the object program broadcast data the program broadcast data relating to the object program broadcast to be viewed by the viewer, and to extract from the received broadcast data, data including information to be obtained when a viewer does not watch a broadcast; and wherein said packet parallel receiver comprises:

a plurality of input storage circuits operable to receive and temporarily store the digital broadcast data from one of the respective digital broadcast data sources, wherein the digital broadcast data comprises the program broadcast data in packet format multiplexed with the required data in packet format;

an input selection circuit operable to sequentially take the stored packets from said plurality of input storage circuits by repeating a process of selecting any of the input storage circuits in which at least one packet is stored and then taking the packet from the selected input storage circuit; and a packet selection circuit operable to select from a sequence of packets sequentially taken by said input selection circuit only packets containing the object program broadcast data and packets containing the data including the information to be obtained even when the viewer does not watch the broadcast;

wherein at least one of the plurality of digital broadcast data sources is a digital data reproduction apparatus capable of reproducing the digital broadcast data; and wherein the program broadcast data relating to the program broadcast to be viewed by the viewer are selected from the digital broadcast data reproduced by the digital data reproduction apparatus.

8. The digital broadcast data receiving apparatus of claim 7 wherein said input selection circuit enables a process of successively taking the packets at a rate higher than a rate obtained by multiplying the maximum value of a data writing rate into said input storage circuits by the number of said input storage circuits.

9. The digital broadcast data receiving apparatus of claim 1 wherein when at least one packet containing the object program broadcast data is stored in any of said input storage circuits, said input selection circuit selects said any of said input storage circuits with priority to take the packet from said any of said input storage circuits.

10. The digital broadcast data receiving apparatus of claim 4 wherein said packet parallel receiving circuit further comprises an input selection circuit operable to receive packet discard information from said packet selection circuit when said packet selection circuit discards unnecessary packets other than packets containing the information to be obtained even when the viewer does not watch the broadcast, and to select packets from said input storage circuit, upon receipt of the packet discard information, when at least one packet of information to be obtained even when the viewer does not watch the broadcast is stored in said input storage circuit.

11. The digital broadcast data receiving apparatus of claim 10 wherein said packet parallel receiving circuit further comprises:

a plurality of said input storage circuit each operable to receive and temporarily store the digital broadcast data in packet format received from a respective broadcast data source; and at least one further packet selection circuit each operable to: take the packets stored in a respective input storage circuit, respectively; and discard unnecessary packets other than packets containing the information to be obtained even when the viewer does not watch the broadcast.

12. The digital broadcast data receiving apparatus of claim 11 wherein said packet parallel receiving circuit further comprises a plurality of input selection circuits operable to:

receive a packet discard information signal from said at least one further packet selection circuit, respectively, when said at least one further packet selection circuit discards unnecessary packets other than packets containing the information to be obtained even when the viewer does not watch the broadcast; and select packets from said plurality of input storage circuit, respectively, upon receipt of the packet discard information, when at least one packet of information to be obtained even when the viewer does not watch the broadcast is stored in said plurality of input storage circuit, respectively.

* * * * *